US010771769B2

(12) United States Patent
Tsubaki

(10) Patent No.: US 10,771,769 B2
(45) Date of Patent: Sep. 8, 2020

(54) DISTANCE MEASURING APPARATUS, DISTANCE MEASURING METHOD, AND IMAGING APPARATUS

(71) Applicant: CANON KABUSHIKI KAISHA, Tokyo (JP)

(72) Inventor: Hidetoshi Tsubaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/962,048

(22) Filed: Apr. 25, 2018

(65) Prior Publication Data
US 2018/0316909 A1 Nov. 1, 2018

(30) Foreign Application Priority Data
Apr. 28, 2017 (JP) .................................. 2017-090624

(51) Int. Cl.
*H04N 13/282* (2018.01)
*H04N 13/296* (2018.01)
(Continued)

(52) U.S. Cl.
CPC ............. *H04N 13/282* (2018.05); *G01C 3/08* (2013.01); *G01C 3/085* (2013.01); *G01C 11/02* (2013.01);
(Continued)

(58) Field of Classification Search
CPC .. H04N 13/282; H04N 13/296; H04N 13/254; G06T 7/521; G06T 7/593; G06T 2207/10152; G01C 11/02; G01C 3/08
(Continued)

(56) References Cited

U.S. PATENT DOCUMENTS 6,243,537 B1 * 6/2001 Higashino ................ G01C 3/08
396/106
2012/0236317 A1 * 9/2012 Nomura ............... G01B 11/026
356/610
(Continued)

FOREIGN PATENT DOCUMENTS

JP 11-190816 A 7/1999
JP 2000-207564 A 7/2000
(Continued)

OTHER PUBLICATIONS

S. B. Kang et al, J. A. Webb, C. L. Zitnick, and T. Kanade, "A Multibaseline Stereo System with Active Illumination and Real-time Image Acquisition", Proceedings of IEEE International Conference on Computer Vision, (1995) p. 88 to 93.
(Continued)

*Primary Examiner* — Hee-Yong Kim
(74) *Attorney, Agent, or Firm* — Cowan, Liebowitz & Latman, P.C.

(57) ABSTRACT

To provide a distance measuring apparatus, a distance measuring method, and an imaging apparatus that can satisfactorily measure a distance. A distance measuring apparatus includes an imaging unit capable of acquiring a plurality of images having view points different from one another and a controlling unit configured to perform control to acquire the plurality of images with the imaging unit in a state in which a patterned light is projected on any region using a projecting unit disposed in a position optically conjugate to the imaging unit and measure a distance on the basis of the plurality of images acquired by the imaging unit.

17 Claims, 13 Drawing Sheets

(51) Int. Cl.

| | |
|---|---|
| *H04N 13/25* | (2018.01) |
| *H04N 13/254* | (2018.01) |
| *G06T 7/521* | (2017.01) |
| *G06T 7/593* | (2017.01) |
| *G01C 11/02* | (2006.01) |
| *G01C 3/08* | (2006.01) |
| *H04N 13/257* | (2018.01) |
| *H04N 13/243* | (2018.01) |
| *H04N 13/271* | (2018.01) |
| *H04N 13/00* | (2018.01) |

(52) U.S. Cl.
CPC .............. *G06T 7/521* (2017.01); *G06T 7/593* (2017.01); *H04N 13/243* (2018.05); *H04N 13/25* (2018.05); *H04N 13/254* (2018.05); *H04N 13/257* (2018.05); *H04N 13/271* (2018.05); *H04N 13/296* (2018.05); *G06T 2207/10012* (2013.01); *G06T 2207/10028* (2013.01); *G06T 2207/10152* (2013.01); *H04N 2013/0081* (2013.01)

(58) Field of Classification Search
USPC .......................................................... 348/47
See application file for complete search history.

(56) References Cited

U.S. PATENT DOCUMENTS

| | | | |
|---|---|---|---|
| 2013/0010078 A1 | 1/2013 | Aoki | |
| 2013/0242090 A1* | 9/2013 | Yoshikawa | .......... G01B 11/026 |
| | | | 348/136 |
| 2018/0108135 A1* | 4/2018 | Lee | ...................... H04N 13/363 |

FOREIGN PATENT DOCUMENTS

| | | |
|---|---|---|
| JP | 2007-096437 A | 4/2007 |
| JP | 2008-232776 A | 10/2008 |
| JP | 5192096 B2 | 2/2013 |
| JP | 2008-232776 * | 10/2018 |

OTHER PUBLICATIONS

Mikio Takagi and Haruhisa Shimoda "New Edition Image Analysis Handbook", University of Tokyo Press, 2004.
A. Rabinovich, et. al., "Objects in context" 2007 IEEE 11th International Conference on Computer Vision, (2007).
Beth Horn, et. al., "Comparison of Segmentation Approaches" Decision Analyst Inc., (2009).

* cited by examiner

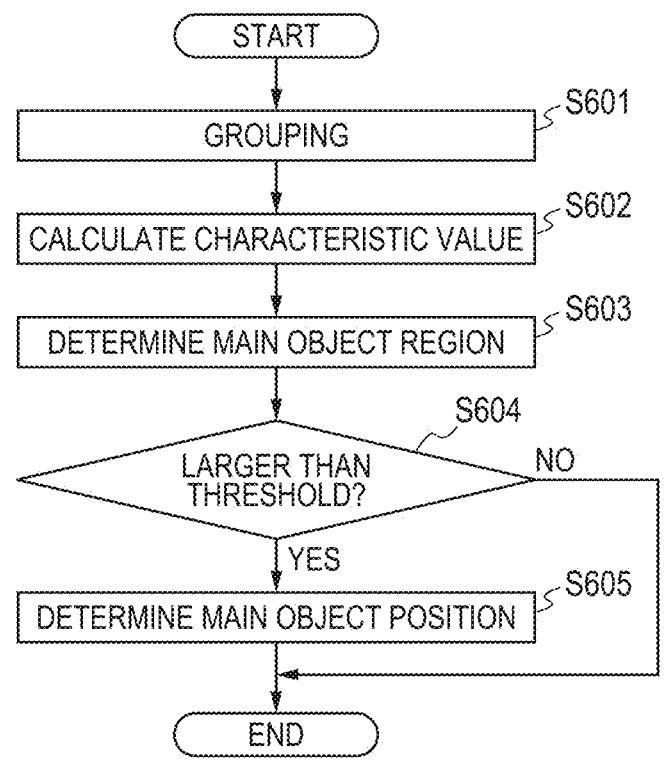
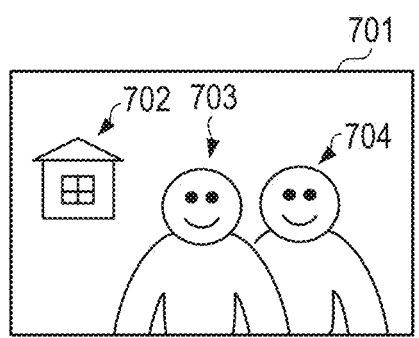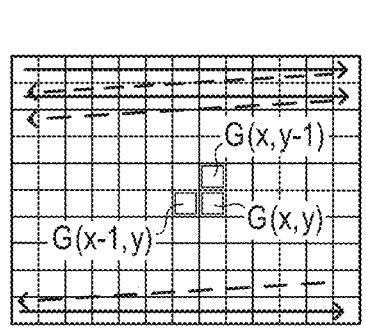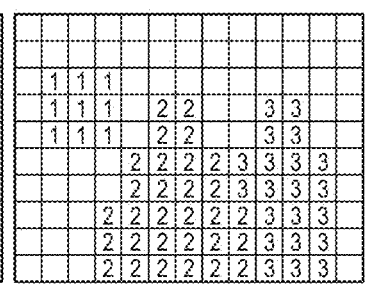

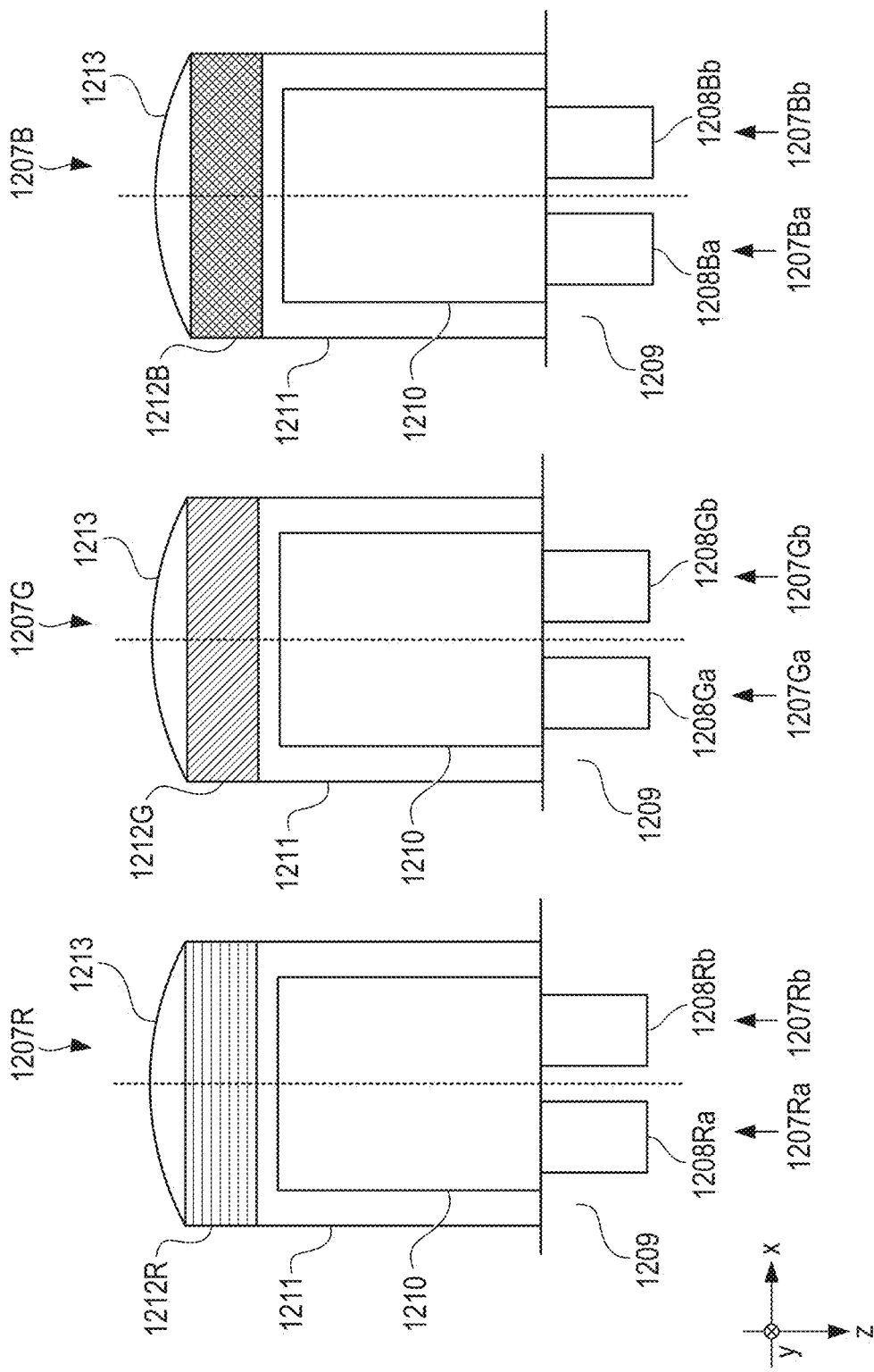

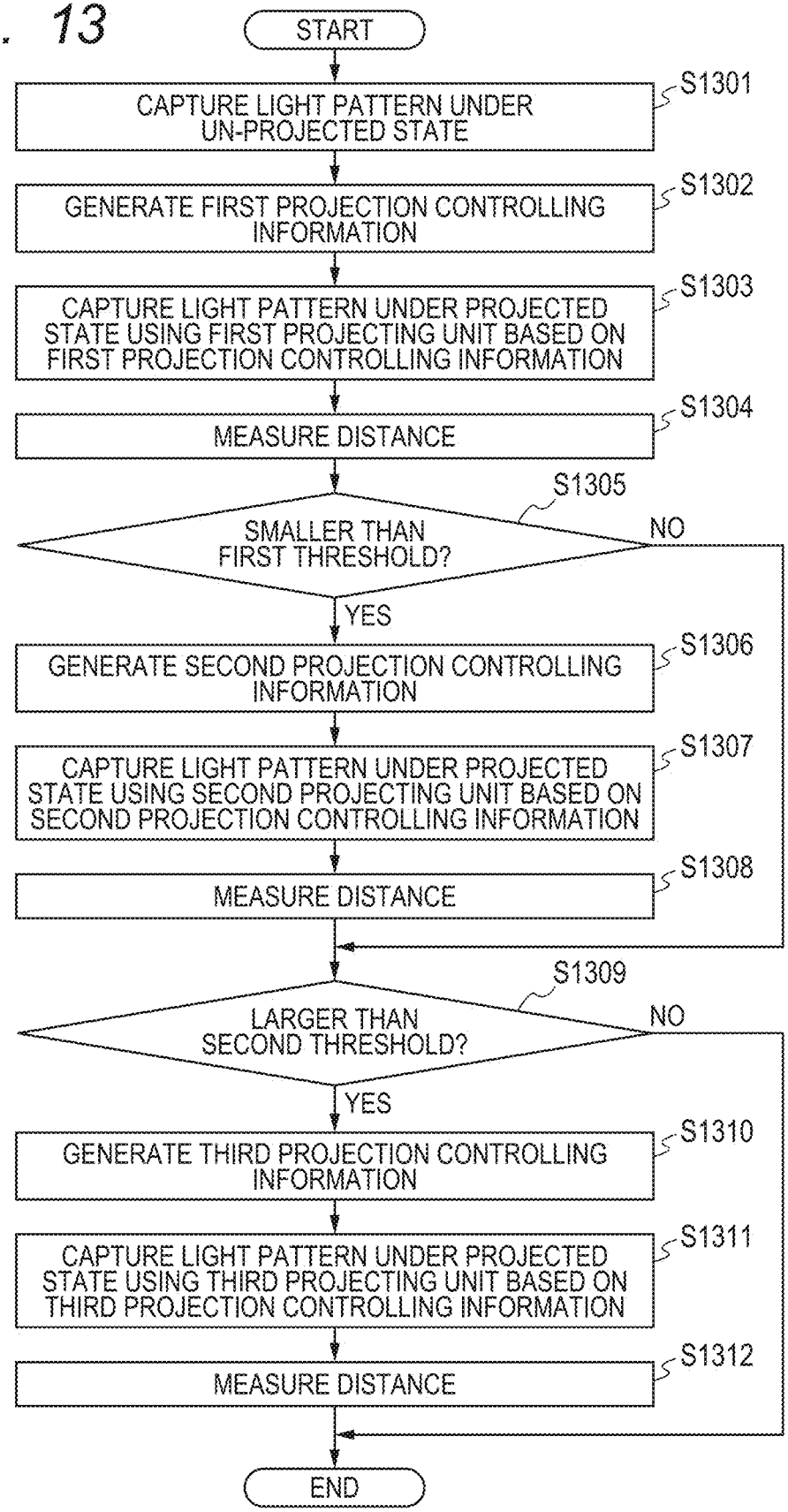

DISTANCE MEASURING APPARATUS, DISTANCE MEASURING METHOD, AND IMAGING APPARATUS

BACKGROUND OF THE INVENTION

Field of the Invention

The present invention relates to a distance measuring apparatus, a distance measuring method, and an imaging apparatus.

Description of the Related Art

Recently, there has been proposed a technique for acquiring distance information from an image obtained by capturing. For example, there has been proposed a technique for acquiring a plurality of images having different view points, calculating a parallax amount on the basis of a correlation among the acquired plurality of images, and measuring a distance on the basis of the calculated parallax amount (Japanese Patent No. 5192096). There has been proposed a technique for projecting a patterned light on an object having a poor texture to thereby improve measurement accuracy of a correlation, thereby improving measurement accuracy of a distance (S. B. Kang, J. A. Webb, C. L. Zitnick, and T. Kanade, "A Multibaseline Stereo System with Active Illumination and Real-time Image Acquisition", Proceedings of IEEE International Conference on Computer Vision, (1995) p. 88 to 93, Japanese Patent Application Laid-Open No. 2008-232776).

SUMMARY OF THE INVENTION

However, in the conventional techniques, a distance cannot always be satisfactorily measured.

An object of the present invention is to provide a distance measuring apparatus, a distance measuring method, and an imaging apparatus that can satisfactorily measure a distance.

According to an aspect of an embodiment, there is provided a distance measuring apparatus including: an imaging unit capable of acquiring a plurality of images having view points different from one another; and a controlling unit configured to perform control to acquire the plurality of images with the imaging unit in a state in which a patterned light is projected on any region using a projecting unit disposed in a position optically conjugate to the imaging unit and measure a distance on the basis of the plurality of images acquired by the imaging unit.

According to the present invention it is possible to provide a distance measuring apparatus, a distance measuring method, and an imaging apparatus that can satisfactorily measure a distance.

Further features of the present invention will become apparent from the following description of exemplary embodiments with reference to the attached drawings.

BRIEF DESCRIPTION OF THE DRAWINGS

FIG. 6 is a flowchart illustrating a method of detecting a position of a main object.

FIGS. 7A, 7B and 7C are diagrams illustrating examples of grouping.

FIGS. 12A, 12B, 12C, 12D and 12E are diagrams illustrating an imaging unit.

FIG. 13 is a flowchart illustrating the operation of the imaging apparatus according to the second embodiment.

DESCRIPTION OF THE EMBODIMENTS

Preferred embodiments of the present invention will now be described in detail in accordance with the accompanying drawings.

Embodiments of the present invention are described in detail below with reference to the drawings. Note that the present invention is not limited to the embodiments described below. The embodiments described below may be combined as appropriate.

First Embodiment

Figure 1:
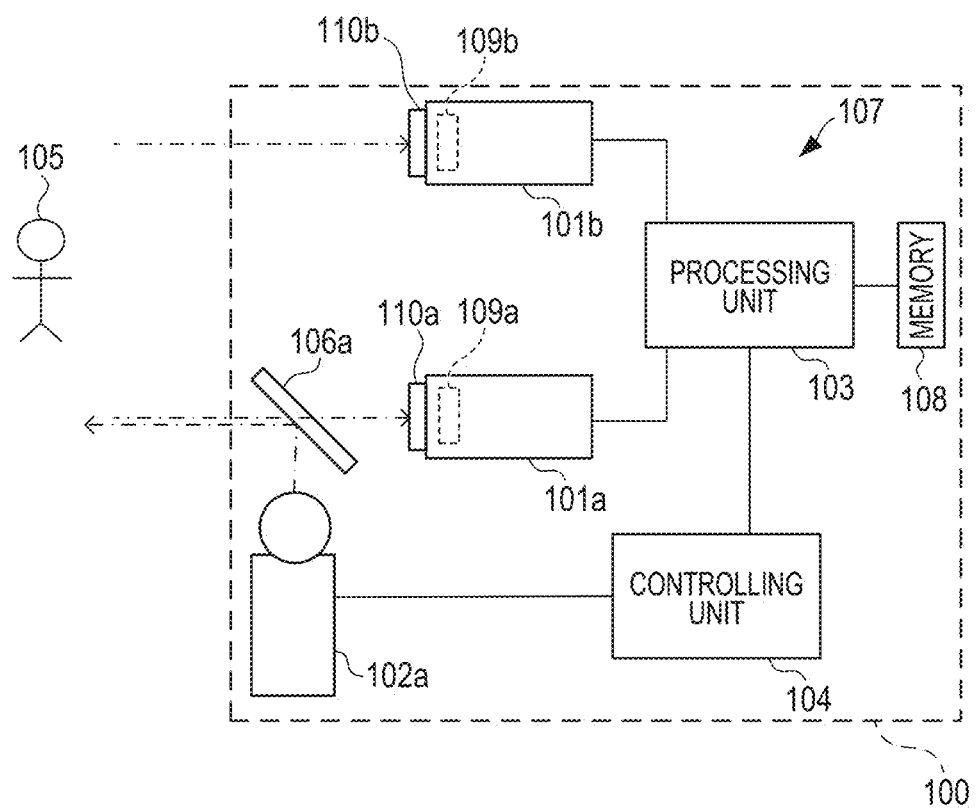
FIG. 1 is a block diagram illustrating an imaging apparatus according to a first embodiment.

A distance measuring apparatus, a distance measuring method, and an imaging apparatus according to a first embodiment are described with reference to the drawings. FIG. 1 is a block diagram illustrating the imaging apparatus according to the first embodiment.

As illustrated in FIG. 1, an imaging apparatus 100 according to this embodiment includes a distance measuring apparatus (a ranging finding apparatus) 107. The distance measuring apparatus 107 according to this embodiment includes imaging units 101a and 101b that can acquire a plurality of images having view points different from one another, a projecting unit 102a that can project a patterned light, a processing unit 103, a controlling unit 104, an optical element 106a, and a memory 108.

The imaging unit (a first imaging unit) 101a includes an imaging element (an image sensor) 109a in which a not-illustrated plurality of pixels is disposed in a matrix shape on a not-illustrated imaging surface. The imaging unit 101a includes an imaging optical system (a lens unit) 110a. The imaging optical system 110a may be non-detachable or may be detachable from the imaging unit 101a. The imaging unit 101a captures an object 105 to thereby acquire a first image (first image data).

The imaging unit (a second imaging unit) 101b includes an imaging element (an image sensor) 109b in which a not-illustrated plurality of pixels is disposed in a matrix shape on a not-illustrated imaging surface. The imaging unit 101b includes an imaging optical system 110b. The imaging optical system 110b may be non-detachable or may be detachable from the imaging unit 101b. The imaging unit 101b captures the object 105 to thereby acquire a second image (second image data).

The imaging unit 101a and the imaging unit 101b are disposed in positions different from each other. Therefore, a parallax occurs between a first image and a second image acquired by the imaging unit 101a and the imaging unit 101b. An image in which a mutual parallax occurs is called parallax image as well. The parallax image is formed by the first image and the second image. Note that, when an imaging unit in general is described, reference numeral 101 is used. When individual specific imaging units are described, reference signs 101a and 101b are used. An image (image data) acquired by the imaging unit 101 may be, for example, a color image or may be a luminance image (a grey scale image). The color image includes, for example, color information of RGB. The luminance image includes brightness information (luminance information) and does not include color information. The imaging unit 101a and the imaging unit 101b can be considered as configuring the imaging unit in conjunction with each other. The imaging unit configured by the imaging unit 101a and the imaging unit 101b can be considered as including a plurality of the imaging elements 109a and 109b disposed in positions different from each other. The image, that is, the image data acquired by the imaging unit 101 is input to the processing unit 103.

The processing unit (an arithmetic unit) 103 stores, in the memory 108, the first image input from the imaging unit 101a and the second image input from the imaging unit 101b. The memory 108 can be configured by, for example, a DRAM (Dynamic Random Access Memory) or a flash memory. The processing unit 103 can perform an arithmetic operation for calculating a correlation between the first image and the second image, that is, a correlation operation. The processing unit 103 can calculate the distance (a distance value) to the object 105 on the basis of a correlation value acquired by the correlation operation. The processing unit 103 can generate a distance image, which is an image showing a two-dimensional distribution of a distance value, on the basis of the distance value calculated in this way. The processing unit 103 can generate, on the basis of the image acquired by the imaging unit 101 and the distance image generated as described above, projection control information (region illumination information) for projecting a patterned light on any region (range or place). The projection control information is information indicating, for example, whether the patterned light is projected on the region, what kind of a pattern the patterned light is, illuminance (brightness) of the patterned light, and a color (a wavelength) of the patterned light. The processing unit 103 can be configured by, for example, a CPU (Central Processing Unit) or a DSP (Digital Signal Processor).

The projecting unit 102a can project a patterned light on any region in a projectable range. The projecting unit 102a is disposed in a position optically conjugate to the imaging unit 101. Specifically, the projecting unit 102a is disposed in a position optically conjugate to the imaging unit 101a. That is, an exit pupil of the projecting unit 102a is disposed in a position optically conjugate to an entrance pupil of the imaging unit 101a via the optical element 106a such as a prism or a half mirror. At least a part of a field of view of the imaging unit 101 and at least a part of the projectable range of the projecting unit 102a overlap each other. The projectable range of the projecting unit 102a desirably coincides with the field of view of the imaging unit 101 or includes the field of view of the imaging unit 101.

The controlling unit 104 controls the entire imaging apparatus 100. The controlling unit 104 controls the projecting unit 102a on the basis of projection control information to thereby project a patterned light on any region as appropriate within the projectable range of the projecting unit 102a. The projecting unit 102a can also project a patterned light of a single color or can also project a color patterned light. That is, the projecting unit 102a can project, as appropriate, a plurality of patterned lights having colors different from one another on any region. The controlling unit 104 can be configured by, for example, a CPU. The processing unit 103 and the controlling unit 104 can be considered as configuring a controlling unit in conjunction with each other. The controlling unit 104 can control, for each of regions, a pattern, illuminance, or a wavelength of the patterned light projected using the projecting unit 102a. The controlling unit 104 can determine, on the basis of an image acquired by the imaging unit 101, a region on which the patterned light is projected. The controlling unit 104 can determine, on the basis of space frequencies of textures of respective regions in the image acquired by the imaging unit 101, the region on which the patterned light is projected. The controlling unit 104 can determine, on the basis of possibility of measurement of a distance based on a plurality of images acquired by the imaging unit 101, the region on which the patterned light is projected. The controlling unit 104 can perform control to project another patterned light having a pattern, illuminance, or a wavelength different from the pattern, the illuminance, or the wavelength of the patterned light on a first region where a distance cannot be measured on the basis of the plurality of images acquired by the imaging unit 101 in a state in which the patterned light is projected. The controlling unit 104 can perform control to measure a distance on the basis of a plurality of images acquired by the imaging unit in a state in which the other patterned light is projected. When the luminance of the first region at the time when the patterned light is projected is smaller than a first threshold, the controlling unit 104 can perform control to project another patterned light having illuminance higher than the illuminance of the patterned light on the first region. The controlling unit 104 can perform control to measure a distance on the basis of a plurality of images acquired by the imaging unit 101 in a state in which the other patterned light is projected. When the luminance of the first region at the time when the patterned light is projected is smaller than the first threshold, the controlling unit 104 can project another patterned light having a wavelength different from the wavelength of the patterned light on the first region. The controlling unit 104 can perform control to measure a distance on the basis of a plurality of images acquired by the imaging unit 101 in a state in which the other patterned light is projected. The controlling unit 104 can perform control to project a patterned light on a region where a repeated pattern is present.

Figure 2A:
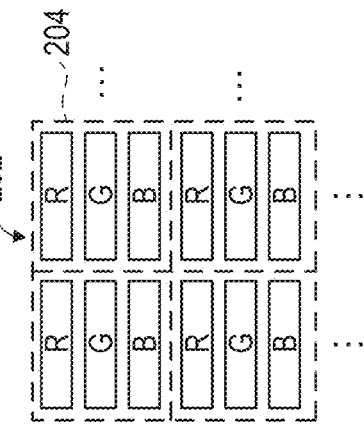
FIGS. 2A, 2B, 2C, 2D and 2E are diagrams illustrating examples of projecting units.
Figure 2B:
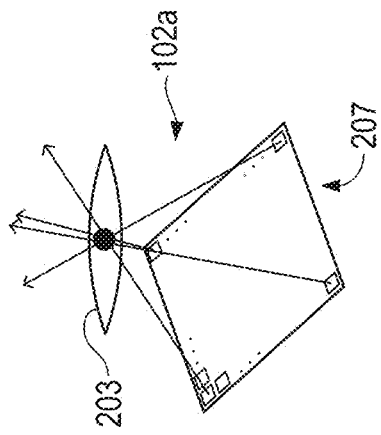

FIGS. 2A to 2E are diagrams illustrating examples of projecting units. FIGS. 2A and 2B illustrate an example of a transmission-type projecting unit. As illustrated in FIG. 2A, the projecting unit 102a includes a light source 201, a transmission-type light modulator 202, and a projection lens 203. Light is emitted from the light source 201. As the light source 201, for example, a semiconductor light emitting element that emits white light is used. As such a semiconductor light emitting element, for example, a light emitting diode (LED) or an organic light emitting diode (OLED) is used. As such a semiconductor light emitting element, a laser diode (LD) may be used.

The light modulator (a light modulating element) 202 modulates the light emitted from the light source 201. As the light modulator 202, for example, a transmission-type electrooptical panel is used. As the transmission-type electrooptical panel, for example, a transmission-type liquid crystal panel is used. FIG. 2B is a diagram illustrating an example of pixels included in the light modulator 202. As illustrated in FIG. 2B, the light modulator 202 includes a plurality of unit pixels (pixels) 204. The plurality of unit pixels 204 is arrayed two-dimensionally, that is, in a matrix shape. The respective unit pixels 204 include pixels R corresponding to red (R), pixels G corresponding to green (G) and pixels B corresponding to blue (B). The pixels R include red color filters. The pixels G include green color filters. The pixels B include blue color filters. Lights passing through the respective pixels R, G and B are respectively colored by the color filters. The light modulator 202 performs control on the respective pixels R, G and B on the basis of the projection control information to thereby modulate, that is, spatially modulate the light emitted from the light source 201. The projection control information includes information indicating the luminance of the R, G and B pixels included in the respective unit pixels 204.

Note that a light condensing optical system widely used in a general-purpose projector may be provided between the light source 201 and the light modulator 202.

As the projection lens 203, for example, a convex lens is used. The projection lens 203 expands the light modulated by the light modulator 202 and projects a patterned light on a predetermined surface configuring an object. For example, such a patterned light can be projected on a floor surface configuring the object. Such a patterned light can be projected on an object such as a piece of furniture disposed on the floor surface.

The projecting unit 102a can project the patterned light on, for example, any region within a projectable range T illustrated in FIG. 2A. A range of a projectable range T may be equal to a range of a floor surface F, may be wider than the range of the floor surface F, or may be narrower than the range of the floor surface F. As illustrated in FIG. 2A, for example, projection regions T1 to T4 and a non-projection region Tb are located within the projectable range T. The projection regions T1 to T4 are regions on which the patterned light is projected. The non-projection region Tb is a region on which the patterned light is not projected in the projectable range T. The projecting unit 102a performs the projection of the patterned light by controlling the light modulator 202 on the basis of the projection control information. As described above, the projection control information is information indicating whether the patterned light is projected on the region, what kind of a pattern the patterned light is, illuminance of the patterned light, and a color of the patterned light. Therefore, the projecting unit 102a can perform the projection of the patterned light such that the patterned light is projected on a certain region in the projectable range and the patterned light is not projected on a certain region in the projectable range. The projecting unit 102a can set a type of a pattern for each of regions, can set brightness of the patterned light for each of the regions, and can set a color of the patterned light for each of the regions.

Figure 2C:
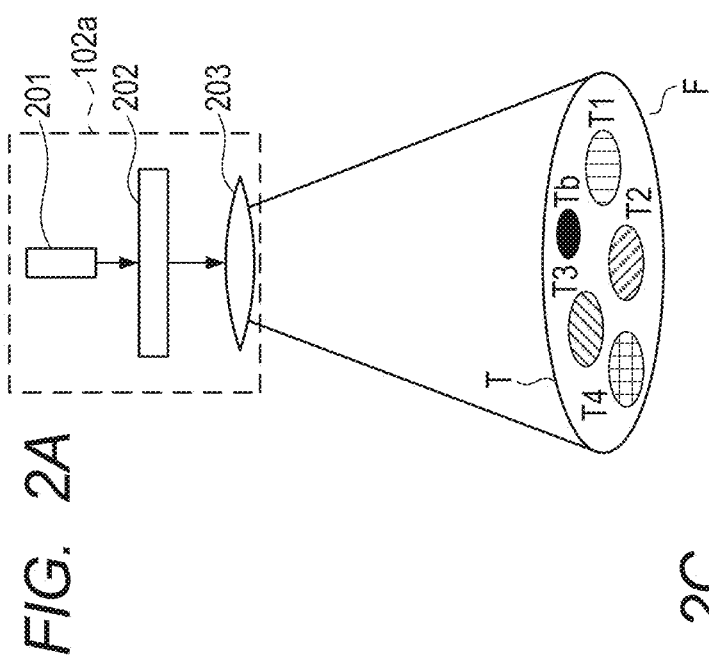
Figure 2D:
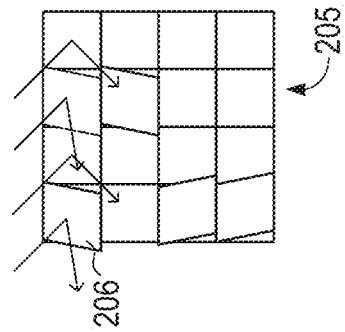

FIG. 2C illustrates an example of a reflection-type projecting unit. As illustrated in FIG. 2C, the projecting unit 102a includes the light source 201, a reflection-type light modulator 205, and the projection lens 203. As the reflection-type light modulator 205, for example, a DMD (Digital Micromirror Device) can be used. FIG. 2D is a diagram illustrating an example of micromirrors included in the light modulator 205. As illustrated in FIG. 2D, the light modulator 205 includes a plurality of movable micromirrors 206. The plurality of micromirrors 206 is disposed in a matrix shape. The light modulator 205 performs control on the respective micromirrors 206 on the basis of the projection control information to thereby modulate, that is, spatially modulate light emitted from the light source 201. The projecting unit 102a includes a not-illustrated light-source controlling unit (a light source driver) that controls the light source 201 and a not-illustrated DMD controlling unit (a DMD driver) that controls inclination (rotation) of the respective plurality of micromirrors 206 included in the light modulator 205. The projecting unit 102a controls the inclination of the respective micromirrors 206 as appropriate with the DMD controlling unit while adjusting a color (a wavelength) of a patterned light and illuminance (a light amount or brightness) of the patterned light as appropriate with the light-source controlling unit. Consequently, the projecting unit 102a can control projection of the patterned light on the projection regions T1 to T4 and non-projection of the patterned light on the non-projection region Tb.

Figure 2E:
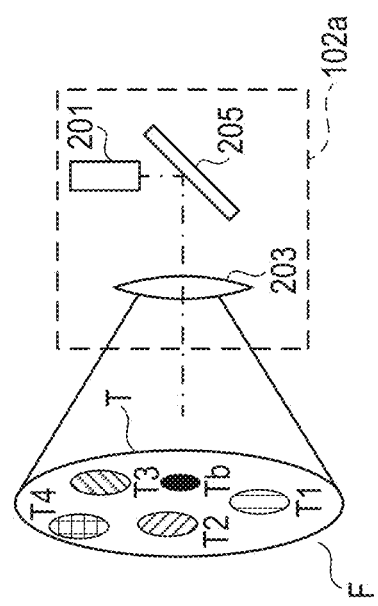

FIG. 2E illustrates an example of a projecting unit including a self-light emitting panel. As illustrated in FIG. 2E, the projecting unit 102a includes a self-light emitting panel 207 on which self-light emitting elements are disposed in a matrix shape and the projection lens 203. As the self-light emitting panel 207, for example, an organic EL panel on which organic light emitting diodes are disposed in a matrix shape or an LED panel on which light emitting diodes are disposed in a matrix shape can be used.

Note that the projecting unit 102a is not limited to these projecting units. For example, a plurality of shutters (not illustrated in FIGS. 2A to 2E) may be disposed in front of the light source 201 to respectively correspond to the projection regions T1 to T4. The patterned light may be projected on the projection regions T1 to T4 as appropriate by opening and closing the shutters as appropriate. In FIGS. 2C and 2D, an example is described in which the DMD is used as the reflection-type light modulator 205. However, the reflection-type light modulator 205 is not limited to the DMD. For example, a LCOS (Liquid crystal on silicon), which is a reflection-type liquid crystal panel, may be used as the light modulator 205. A Galvano scanner obtained by combining a laser light source and a Galvano mirror may be used in the projecting unit 102a.

In this way, the projecting unit 102a can perform the projection of the patterned light such that the patterned light is projected on a certain region in the projectable range and the patterned light is not projected on a certain region in the projectable range. The projecting unit 102a can set a type of a pattern for each of regions, can also set brightness of the patterned light for each of the regions, and can also set a color of the patterned light for each of the regions.

Figure 3:
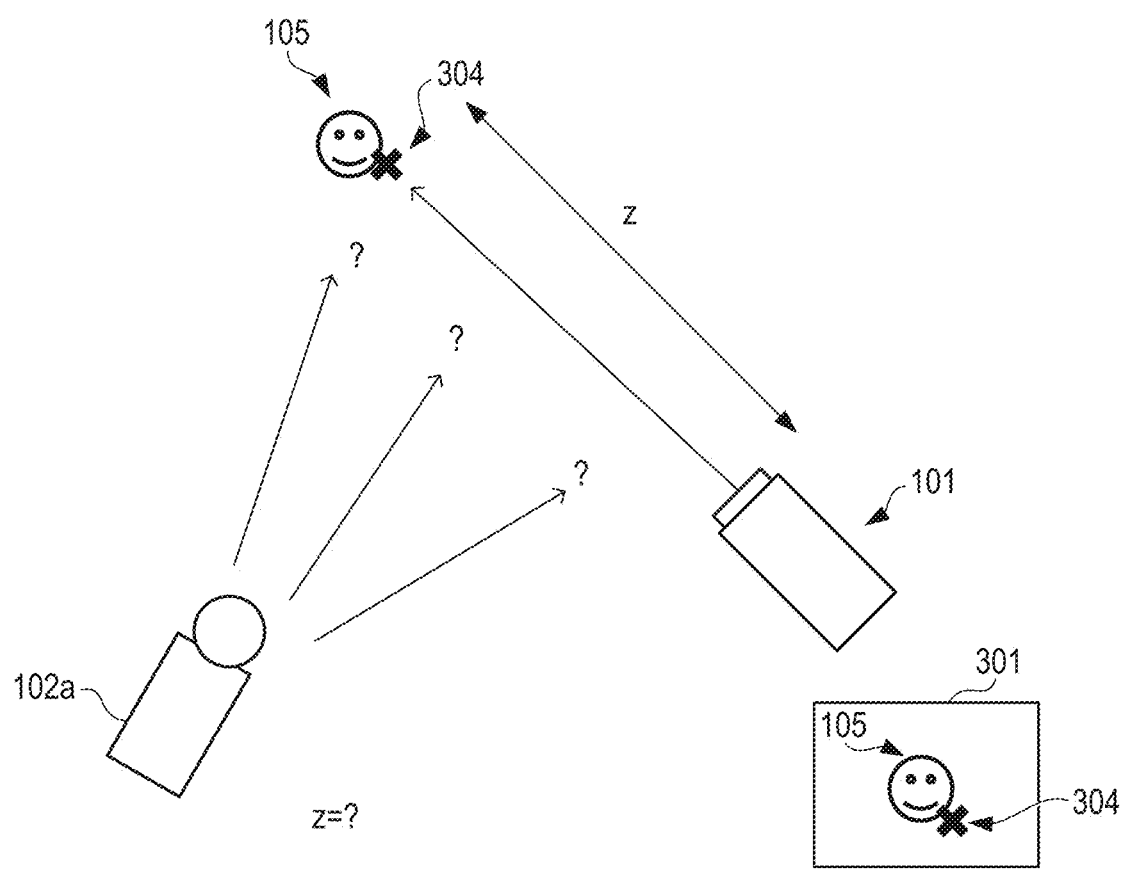
FIG. 3 is a diagram illustrating an example in which a parallax occurs between the projecting unit and an imaging unit.

As described above, the projecting unit 102a is disposed in the position optically conjugate to the imaging unit 101a. That is, the exit pupil of the projecting unit 102a is disposed in a position optically conjugate to the entrance pupil of the imaging unit 101a via the optical element 106a such as a prism or a half mirror. The projecting unit 102a is disposed in the position optically conjugate to the imaging unit 101a because of a reason described below. When the exit pupil of the projecting unit 102a is not disposed in the position optically conjugate to the entrance pupil of the imaging unit 101, a parallax occurs between the projecting unit 102a and the imaging unit 101. FIG. 3 is a diagram illustrating an example in which a parallax occurs between the projecting unit 102*a* and the imaging unit 101. When it is attempted to project a patterned light on a part of attention 304 of the object 105 on the basis of an image 301 obtained by the imaging unit 101, a problem described below occurs if a parallax is present between the projecting unit 102*a* and the imaging unit 101. That is, in such a case, if a positional relation between the projecting unit 102*a* and the imaging unit 101 and a distance value z from the imaging unit 101 to the part of attention 304 cannot be specified, it cannot be specified where on an epipolar line viewed from the projecting unit 102*a* the part of attention 304 is present. Therefore, in such a case, it is difficult to project the patterned light on the part of attention 304 from the projecting unit 102*a*. Because of such a reason, in this embodiment, the projecting unit 102*a* is disposed in the position optically conjugate to the imaging unit 101*a*.

Figure 4:
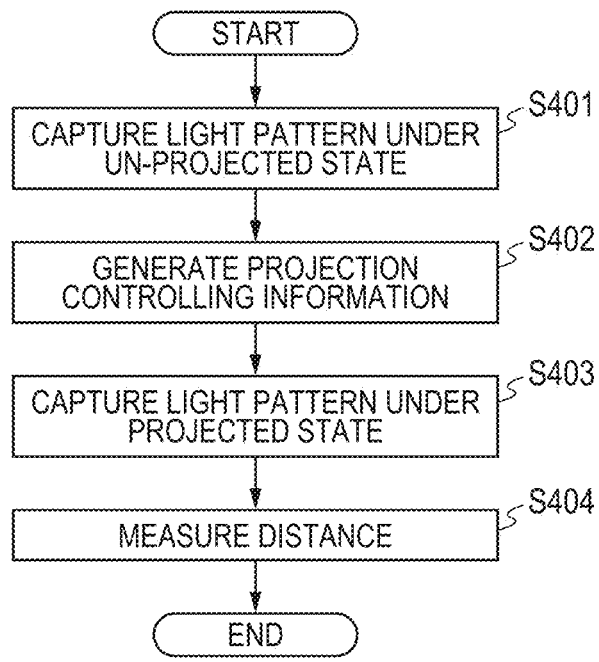
FIG. 4 is a flowchart illustrating the operation of the imaging apparatus according to the first embodiment.

FIG. 4 is a flowchart illustrating the operation of the imaging apparatus according to this embodiment.

First, in step S401, the controlling unit 104 acquires an image by performing imaging using the imaging unit 101 in a state in which a patterned light is not projected.

Figure 5A:
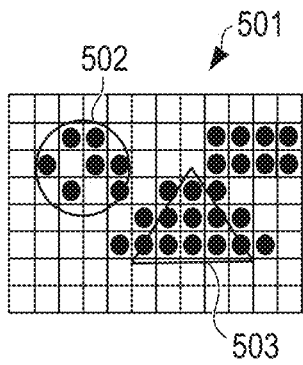
FIGS. 5A, 5B and 5C are diagrams illustrating examples of segmentation.
Figure 5B:
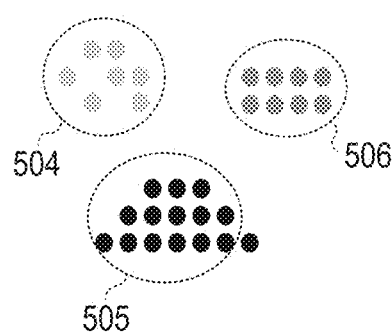
Figure 5C:
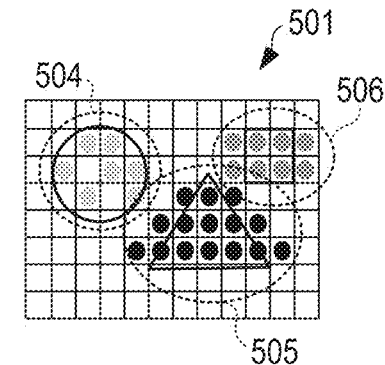

In step S402, the processing unit 103 generates projection control information, for example, as described below using the image acquired in step S401. That is, the processing unit 103 performs, on the image acquired in step S401, area division, that is, segmentation with, for example, graph cut in which a super pixel is used. FIGS. 5A to 5C are diagrams illustrating an example of the segmentation. FIG. 5A illustrates an example of an input image, that is, the image acquired in step S401. As illustrated in FIG. 5A, an image 501 includes objects 502 and 503. The processing unit 103 performs grouping on such an image 501 as described below. That is, when a difference between an evaluation value of a certain group and an evaluation value of a certain element is equal to or smaller than a preset threshold, the processing unit 103 combines the element with the group. On the other hand, when the difference between the evaluation value of the group and the evaluation value of the element exceeds the threshold, the processing unit 103 does not combine the element with the group. Such an element may be, for example, a pixel or may be a block. Such an evaluation value can be determined on the basis of a coordinate, a luminance value, and color information. The luminance value and the color information are obtained by converting, for example, data of YCrCb. By performing the grouping with such a method, groups 504, 505 and 506 illustrated in FIGS. 5B and 5C, that is, segments are generated. Note that such a grouping method is described in, for example, "New Edition Image Analysis Handbook", Mikio Takagi and Haruhisa Shimoda, University of Tokyo Press, 2004. Such a grouping method is called region growth method. FIG. 5C illustrates a state in which the segmentation is performed. In this way, the segmentation is performed on the image 501 acquired in step S401. Thereafter, the processing unit 103 performs, through a Wavelet analysis or a frequency analysis, a texture analysis on the segments obtained by the segmentation, that is, a region of interest. The processing unit 103 generates projection control information on the basis of a result of the texture analysis. As described above, the projection control information is information for controlling, for example, whether the patterned light is projected on the region, what kind of a pattern the patterned light is, illuminance (brightness) of the patterned light, and a color (a wavelength) of the patterned light. The processing unit 103 generates, for example, projection control information for projecting the patterned light on a region having a poor texture and not projecting the patterned light on a region having a rich texture. For example, when the patterned light is projected on the region although a sufficiently fine texture is present in the region, the resolution of a correlation value is likely to decrease to the contrary. Therefore, for example, projection control information for not projecting the patterned light on a region where a sufficiently fine texture is present is generated. When the patterned light is irradiated on a region where a repeated pattern is present, projection control information for erasing the repeated pattern with a repeated pattern of a complementary color of the repeated pattern and projecting light of a desired pattern may be generated. A material and a reflectance of an object may be estimated according to a color and a texture to adjust a color and illuminance of the patterned light as appropriate. For example, since a black region highly likely has a low reflectance, a patterned light having large illuminance may be projected. A type of a pattern may be set as appropriate on the basis of the breadth of a region on which the pattern light is projected. The type of the pattern may be set as appropriate on the basis of a tilt of a surface of the region on which the patterned light is projected. The tilt of the surface can be estimated, for example, on the basis of a change gradient of a gradation. Examples of the type of the pattern include a bar-like pattern, a checker pattern, and a circular pattern. For example, when light of the circular pattern is projected on a surface, the normal of which greatly tilts with respect to the optical axis of the imaging unit 101, accuracy of a calculated distance value decreases. However, robust association can be formed.

Note that a generation method for projection control information is not limited to the methods described above. For example, projection control information for projecting a patterned light on a region where a main object is located and not projecting the patterned light on a region other than the region where the main object is located. Such projection control information can be generated, for example, on the basis of a position of the main object detected as described below FIG. 6 is a flowchart illustrating a method of detecting a position of the main object. In step S601, the processing unit 103 performs grouping, that is, grouping processing as described below on the image acquired in step S401. FIGS. 7A to 7C are diagrams illustrating an example of the grouping. FIG. 7A illustrates an image 701 acquired in step S401. The image 701 is a color image or a luminance image. FIG. 7B is a diagram illustrating raster scan. Arrows conceptually indicate the raster scan. As indicated by the arrows in FIG. 7B, the scan is started from the upper left of the image 701 and performed until the scan reaches the lower right. The grouping processing may be performed in units of a pixel or may be performed in units of a block, which is a set of local pixels. An example is described in which the grouping is performed in units of a block. However, the grouping can be performed in units of a pixel in the same manner as the grouping in units of a block. The processing unit 103 performs determination described below among a certain block $G(x, y)$, a block $G(x, y-1)$ located on the upper side of the block $G(x, y)$, and a block $G(x-1, y)$ located on the left side of the block $G(x, y)$. That is, the processing unit 103 determines whether these blocks are included in the same group. By sequentially performing such determination, the processing unit 103 can resultantly determine whether adjacent blocks are included in the same group. In this case, no block is present on the upper side of a block located on the upper edge of the image 701, that is, a block of y=0. Therefore, such determination processing is not performed on the block. No block is present on the left side of a block located on the left edge of the image 701, that is, a block of x=0. Therefore, such determination processing is not performed on the block. The processing unit 103 records a result of the determination in the memory 108. For example, a number 1 is affixed to, for example, a block corresponding to a group detected first. For example, a number 2 is affixed to, for example, a block corresponding to a group detected second. For example, a number 3 is affixed to, for example, a block corresponding to a group detected third. Processing for affixing numbers to blocks is called labeling. FIG. 7C is a diagram illustrating a state in which the labeling is performed. As illustrated in FIG. 7C, a number 1 is affixed to a block corresponding to an object 702, a number 2 is affixed to a block corresponding to an object 703, and a number 3 is affixed to a block corresponding to an object 704. When a difference between an evaluation value of a certain block and an evaluation value of a block adjacent to the block is equal to or smaller than a preset threshold, the processing unit 103 determines that these blocks belong to the same group. On the other hand, when a difference between an evaluation value of a certain block and an evaluation value of a block adjacent to the block exceeds the threshold, the processing unit 103 determines that these blocks do not belong to the same group. Such evaluation values can be determined on the basis of gradation, specifically, a luminance value and color information. Such evaluation value can also be determined on the basis of a distance value, which is the distance to an object.

In step S602, the processing unit 103 calculates a characteristic value, which is a value indicating a characteristic of each group located in the image, in other words, each group located in a capturing space. Such a characteristic value is used to determine a main object region in step S603 described below. Examples of such a characteristic value include a main object degree. For example, the processing unit 103 calculates a main object degree, which is a characteristic value, with respect to an object corresponding to each group. The main object degree is comprehensively calculated on the basis of a distance J to the object corresponding to the group, width C of the group in the image, height H of the group in the image, and a distance P from the center of the image to the center of gravity position of the group. For example, a main object degree S can be calculated on the basis of Expression (1) described below.

$$S=(a1 \times C + a2 \times H)/P + a3 \times J \quad (1)$$

Note that, in Expression (1), a1, a2 and a3 are weighting constants. For example, the distance J to the object may be, for example, an average distance to parts of the object or may be a representative value of the distance to the object. The distance J to the object can be calculated, for example, on the basis of a correlation between the first image acquired by the imaging unit 101*a* and the second image acquired by the imaging unit 101*b*. When the distance J to the object is the average distance to the parts of the object, for example, distances to the parts of the object are calculated for each of blocks.

Figure 8A:
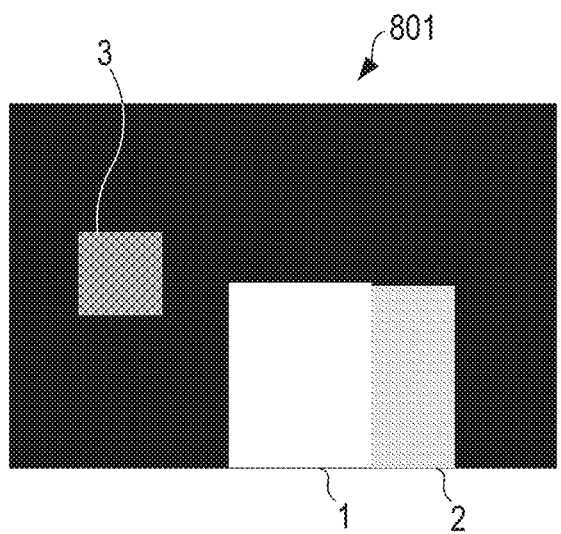
FIGS. 8A and 8B are diagrams illustrating a characteristic value map.
Figure 8B:
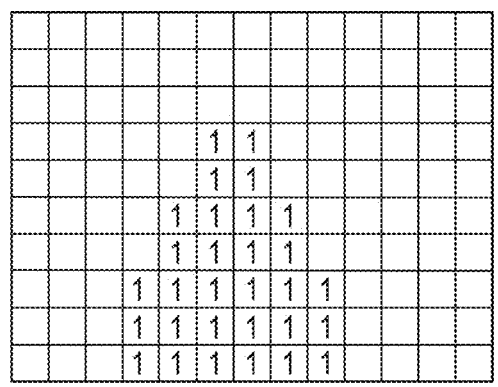

FIGS. 8A and 8B are diagrams illustrating a characteristic value map. FIG. 8A is a characteristic value map 801 corresponding to the image 701 illustrated in FIG. 7A. In FIG. 8A, a characteristic value is higher as luminance is higher. That is, a white portion in FIG. 8A has a highest characteristic value. A black portion in FIG. 8A has a lowest characteristic value. Numerical values illustrated in FIG. 8A indicate descending order of characteristic values. The characteristic value is higher as the numerical value illustrated in FIG. 8A is smaller. As illustrated in FIG. 8A, the object 703 that occupies a large area in the image 701 and is close to the center in the image 701 and located in a place close to the imaging apparatus 100 has a high characteristic value. On the other hand, the object 702 that occupies a small area in the image 701 and is located in the peripheral part in the image 701 and located in a place far from the imaging apparatus 100 has a low characteristic value.

In step S603, the processing unit 103 selects a main object region, for example, as described below. For example, the processing unit 103 determines a group having a high main object degree as a group corresponding to a main object and sets, as a main object region, a region corresponding to a block belonging to the group determined as the group corresponding to the main object. As described above, in FIG. 8A, a characteristic value is higher as a numerical value is smaller. Therefore, an object having a highest characteristic value is an object located in a place to which a numerical value 1 is affixed in FIG. 8A. The region to which 2 is affixed in FIG. 7A corresponds to a region having a highest characteristic value. Therefore, a region labeled as 2 in FIG. 7C is determined as a main object region.

In step S604, the processing unit 103 determines whether a region characteristic value of the main object region determined in step S603 is equal to or larger than a threshold. When the characteristic value is equal to or larger than the threshold (YES in step S604), that is, when a main object is present in the image, the processing unit 103 issues a flag indicating that the main object is present and shifts to step S605. On the other hand, when the characteristic value is smaller than the threshold (NO in step S604), that is, a main object is absent in the image, the processing unit 103 issues a flag indicating that a main object is absent and ends the processing illustrated in FIG. 6.

In step S605, the processing unit 103 determines a position of the main object. The position of the main object is determined, for example, on the basis of a coordinate of a pixel corresponding to the main object.

In this way, main object information indicating whether a main object is included in the image and the position of the main object is acquired.

The processing unit 103 generates, on the basis of the main object information obtained in this way, projection control information for projecting a patterned light on only the main object region. FIG. 8B is a diagram illustrating an example of the projection control information. A region to which 1 is affixed in FIG. 8B indicates a region on which a patterned light is projected. The region to which 1 is affixed in FIG. 8B corresponds to the region to which 2 is affixed in FIG. 7C, that is, a region corresponding to the object 703. As the patterned light, for example, a bar-like pattern, which is a most orthodox pattern, is used.

In this way, the projection control information for projecting the patterned light on the region where the main object is located and not projecting the patterned light on the region other than the region where the main object is located may be generated.

In step S403, the controlling unit 104 performs imaging using the imaging unit 101*a* and the imaging unit 101*b* in a state in which the patterned light is projected using the projecting unit 102*a* on the basis of the projection control information generated in step S402. Consequently, a first image and a second image in a state in which the patterned light is irradiated on a desired region are acquired.

In step S404, the processing unit 103 performs, on the basis of a correlation between the first image and the second image acquired in step S403, distance measurement for calculating distances to parts in the image. The processing unit 103 generates a distance image (a distance map) indicating a two-dimensional distribution of a distance value on the basis of a result of the distance measurement. A correlation value is calculated on the basis of the first image and the second image captured in the state in which the patterned light is irradiated on the desired region. A distance value is calculated on the basis of the correlation value. Therefore, a satisfactory distance image can be obtained.

Note that the distance image obtained in this way can be used for, for example, processing described below. For example, it is possible to perform processing for focusing on any part, that is, auto-focus processing on the basis of the distance value indicated by the distance image. By performing, as appropriate, on the image acquired by the imaging unit 101a, processing based on a two-dimensional distribution of the distance value indicated by the distance image, it is possible to perform any blur addition processing. It is also possible to perform refocus processing on the basis of the two-dimensional distribution of the distance value indicated by the distance image.

Figure 9:
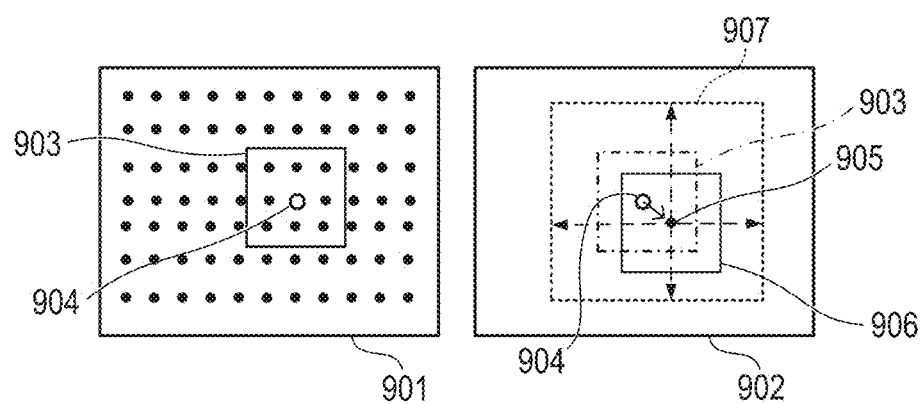
FIG. 9 is a diagram illustrating examples of block matching.

A correlation between the first image and the second image can be calculated, for example, as described below. FIG. 9 is a diagram illustrating an example of block matching. The block matching is a method of detecting corresponding points according to a correlation. A first image 901 located on the left side of FIG. 9 is a standard image. A second image 902 located on the right side of FIG. 9 is a reference image. The first image 901 is, for example, an image acquired by the imaging unit 101a. The second image 902 is, for example, an image acquired by the imaging unit 101b. A motion vector between the first image 901, which is the standard image, and the second image 902, which is the reference image, corresponds to a parallax. The processing unit 103 sets, as a template 903, a partial region having a predetermined size centering on a point (a point of attention) 904 in the first image 901. The processing unit 103 sets any search range 907 in the second image 902 and sequentially moves, in the search range 907, a partial region 906 having a predetermined size centering on a point (a point of attention or a corresponding point) 905. The processing unit 103 searches for a position where the template 903 and the partial region 906 coincide most while sequentially moving the partial region 906. Note that the first image 901 and the second image 902 may be color images, may be luminance images, or may be a modulated image such as a differential image. The processing unit 103 calculates a similarity degree between the template 903 and the partial region 906 as described below. That is, the processing unit 103 calculates the similarity degree with a correlation operation such as a SSD (Sum of Square Difference), a SAD (Sum of Absolute Difference), or a normalized cross-correlation. A similarity degree R(x, y, x', y') in the normalized cross-correlation is calculated by Expressions (2) and (3) described below.

$$R(x, y, x', y') = \frac{\sum_{i=-M_T}^{M_T} \sum_{j=-N_T}^{N_T} \{I_{(x,y)}(i, j) - \bar{I}\}\{I'_{(x',y')}(i, j) - \bar{I'}\}}{\sqrt{\sum_{i=-M_T}^{M_T} \sum_{j=-N_T}^{N_T} \{I_{(x,y)}(i, j) - \bar{I}\}^2} \sqrt{\sum_{i=-M_T}^{M_T} \sum_{j=-N_T}^{N_T} \{I'_{(x',y')}(i, j) - \bar{I'}\}^2}} \quad (2)$$

$$\bar{I} = \frac{1}{M_T N_T} \sum_{i=-M_T}^{M_T} \sum_{j=-N_T}^{N_T} I_{(x,y)}(i, j), \quad \bar{I'} = \frac{1}{M_T N_T} \sum_{i=-M_T}^{M_T} \sum_{j=-N_T}^{N_T} I_{(x',y')}(i, j) \quad (3)$$

Note that (x, y) indicates the position of the center of the template 903 in a standard image I, that is, the first image 901. That is, (x, y) indicates the position of the point (the point of attention) 904. (x', y') indicates the position of the center of the partial region 906 in the second image 902. That is, (x', y') indicates the position of the point (the corresponding point) 905. $I_{(x, y)}(i, j)$ indicates an image corresponding to the template 903. $I'_{x',y'}(i, j)$ indicates an image corresponding to the partial region 906.

The processing unit 103 regards the point 905 having a highest similarity degree as a point (a corresponding point) corresponding to the point 904 as a result of generally calculating the similarity degree between the template 903 and the partial region 906 while sequentially moving the partial region 906 in the search range 907. Examples of such a similarity degree include a correlation score. The processing unit 103 calculates a motion vector on the basis of the point 904 and the point (the corresponding point) 905 corresponding to the point 904. If there is no occlusion, basically, motion vectors are calculated by the number of points 904 set in the first image 901. The motion vector is represented by a vector starting from the position of the point 904 in the first image 901 and ending in the position of the point 905 in the second image 902. Such a vector is represented by Expression (4) described below.

$$(x,y,x',y')_i, i=1, \ldots, m (m: \text{the number of motion vectors}) \quad (4)$$

Note that polynomial fitting may be carried out on the correlation score acquired by sequentially moving the partial region 906 within the search range 907. A peak position of the similarity degree may be more highly accurately calculated. The point 905 corresponding to the point 904 may be calculated at sub-pixel accuracy by performing processing for increasing pixels of the first image 901 and the second image 902.

The processing unit 103 acquires a dense corresponding point image by calculating, in the second image, points (pixels) corresponding to all points (pixels) in the first image. A positional deviation amount d=(x'−x) between the point 904 in the first image 901 and the point 905 in the second image 902 is called parallax.

Figure 10:
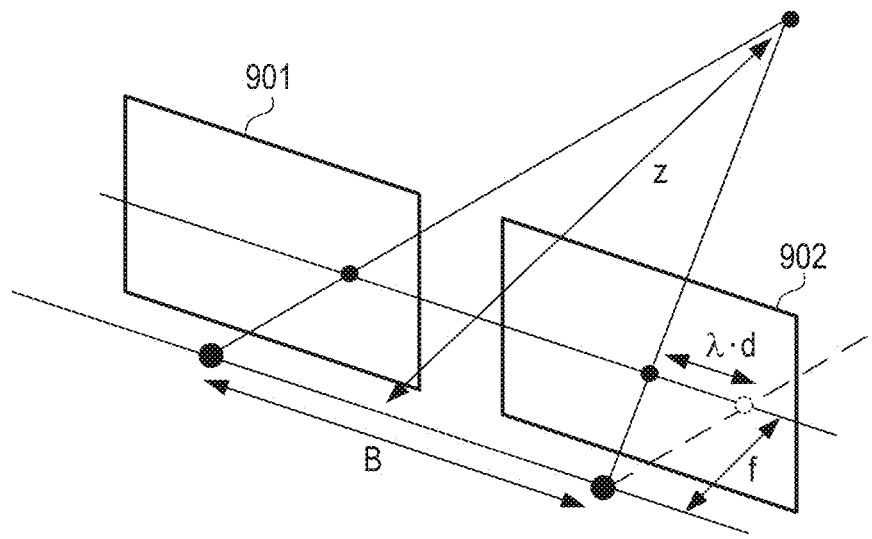
FIG. 10 is a diagram illustrating a relation between the distance to an object and a parallax.

FIG. 10 is a diagram illustrating a relation between the distance to the object and the parallax. When the parallax is represented as d and the distance from the imaging unit 101 to the object is represented as z, Expression (5) described below holds.

$$d = \frac{B \cdot f}{\lambda \cdot z} \quad (5)$$

Note that B represents a base line length, specifically, the distance between the imaging unit 101a and the imaging unit 101b, λ represents a pixel size, and f represents a focal length of the imaging unit 101. The processing unit 103 generates a distance image indicating a two-dimensional distribution of a distance value z on the basis of Expression (5).

In this way, according to this embodiment, the projection control information is generated on the basis of the image acquired by the imaging unit 101a disposed in the position optically conjugate to the projecting unit 102a. The projection of the patterned light is performed by the projecting unit 102a on the basis of the projection control information. Therefore, according to this embodiment, it is possible to provide a distance measuring apparatus and an imaging apparatus including the distance measuring apparatus that can project a patterned light on a desired region and satisfactorily measure a distance.

Second Embodiment

Figure 11:
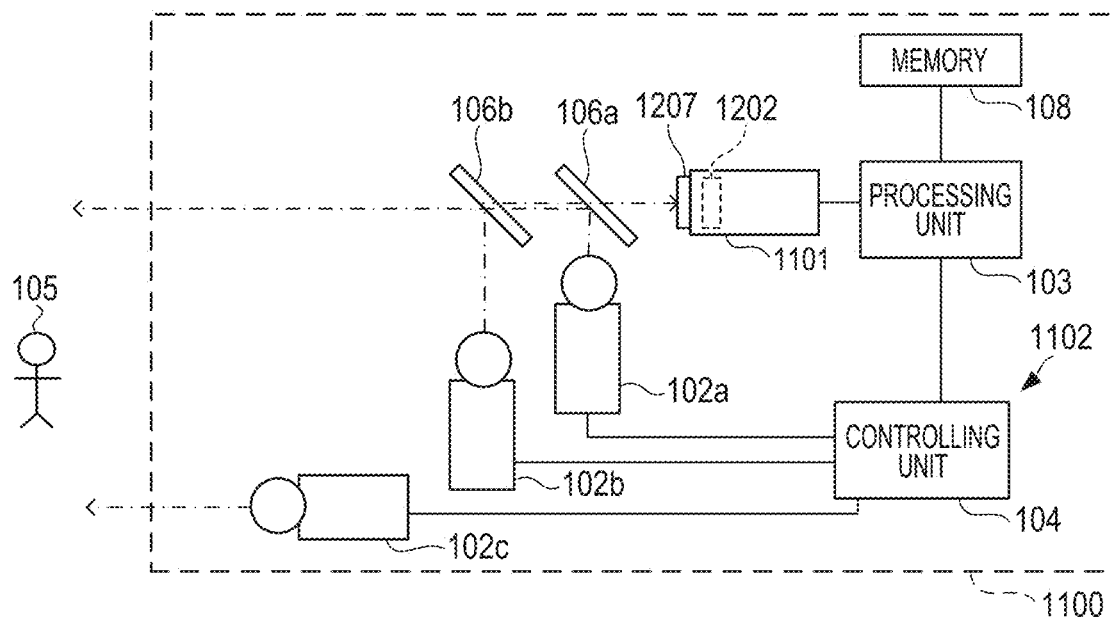
FIG. 11 is a block diagram illustrating an imaging apparatus according to a second embodiment.

A distance measuring apparatus, a distance measuring method, and an imaging apparatus according to a second embodiment are described with reference to the drawings. FIG. 11 is a block diagram illustrating an imaging apparatus 1100 according to this embodiment. The same components as the components of the imaging apparatus according to the first embodiment illustrated in FIGS. 1 to 10 are denoted by the same reference numerals and signs. Description of the components is omitted or simplified.

As illustrated in FIG. 11, the imaging apparatus 1100 according to this embodiment includes a distance measuring apparatus 1102. The distance measuring apparatus 1102 includes one imaging unit 1101, three projecting units 102a to 102c, the processing unit 103, the controlling unit 104, optical elements 106a and 106b, and the memory 108.

Figure 12A:
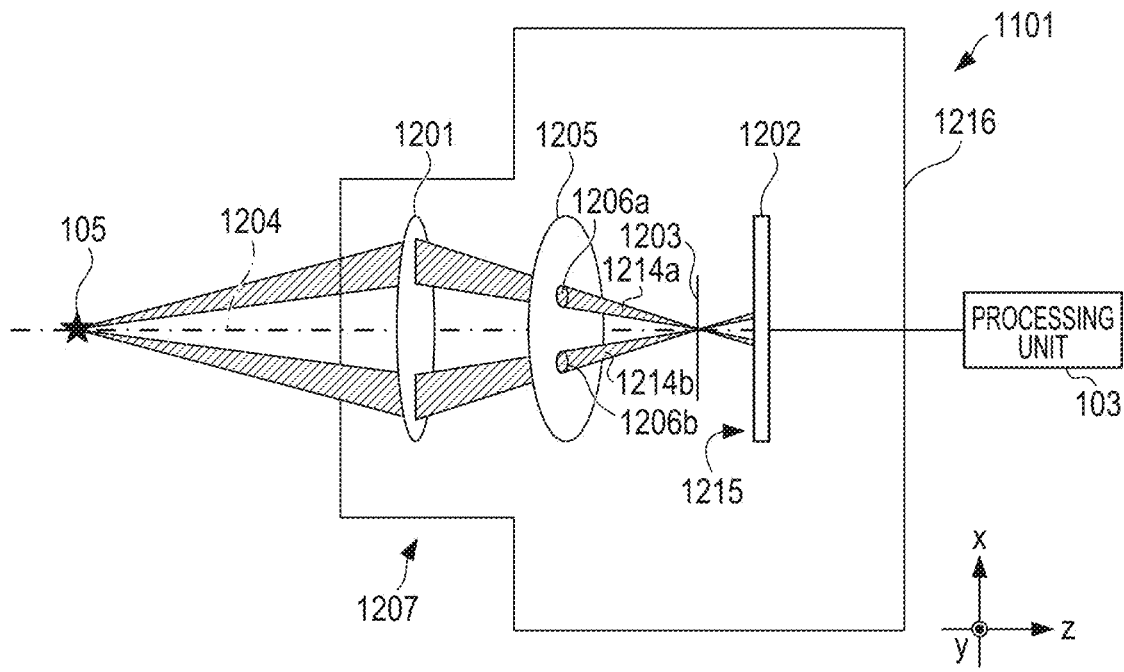

FIG. 12A is a diagram illustrating the imaging unit 1101. As illustrated in FIG. 12A, an imaging element 1202 is included in a body (main body) 1216 of the imaging unit 1101. An imaging optical system (a lens or a lens unit) 1207 including a lens 1201 is included in the main body 1216 of the imaging unit 1101. The imaging optical system 1207 is an imaging optical system, that is, a pupil division optical system configured to divide an exit pupil 1205 into a first pupil region 1206a and a second pupil region 1206b different from each other. The imaging optical system 1207 may be detachably from the main body 1216 of the imaging unit 1101 or may be non-detachable from the main body 1216. The imaging unit 1101 can acquire a plurality of optical images, that is, a first optical image and a second optical image formed by a first light beam 1214a and a second light beam 1214b respectively passing through the first pupil region 1206a and the second pupil region 1206b of the imaging optical system 1207. The first optical image is called A image as well and the second optical image is called B image as well. The processing unit (the arithmetic unit) 103 calculates a parallax amount, which is a relative positional deviation amount between the A image and the B image acquired by the imaging unit 1101, and converts the parallax amount into a defocus amount using a conversion coefficient based on the base line length to thereby calculate a distance to an object. In other words, the processing unit 103 converts the parallax amount into a distance value on the basis of the base line length and a geometrical relation. For example, an interval on the exit pupil 1205 between the center of gravity of the first light beam 1214a passing through the first pupil region 1206a and the center of gravity of the second light beam 1214b passing through the second pupil region 1206b corresponds to the base line length. In this way, a distance from the imaging unit 1101 to the object is calculated.

Figure 12B:
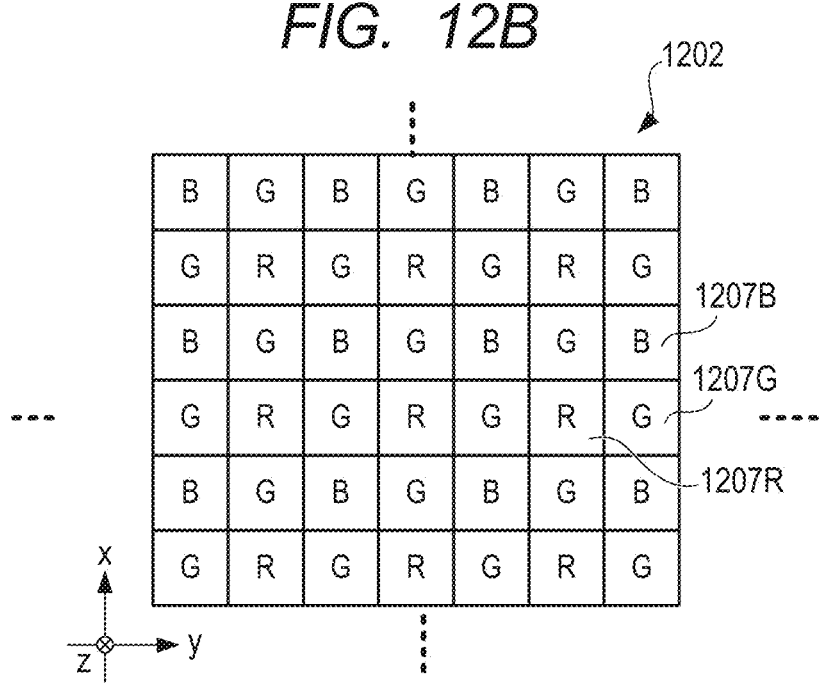

On an imaging surface (a pixel array region) 1215 of the imaging element 1202, a large number of unit pixels 1207R, 1207G and 1207B are disposed in a matrix shape. FIG. 12B is a diagram illustrating a layout of the unit pixels 1207R, 1207G and 1207B disposed on the imaging surface 1215 of the imaging element 1202. As illustrated in FIG. 12B, the unit pixels (rang finding pixels) 1207R, 1207G and 1207B are arrayed on an xy plane. Such an array is called Bayer array. Note that an example is described in which the array of the unit pixels 1207R, 1207G and 1207B is the Bayer array. However, the array of the unit pixels 1207R, 1207G and 1207B is not limited to the Bayer array and can be set as appropriate. Note that, when a unit pixel in general is described, reference numeral 1207 is used. When specific unit pixels are described, reference numerals 1207R, 1207G and 1207B are used. FIG. 12C is a sectional view of the respective unit pixels. As illustrated in FIG. 12C, photoelectric conversion sections 1208Ra, 1208Rb, 1208Ga, 1208Gb, 1208Ba and 1208Bb are formed on semiconductor substrates 1209. Note that, when a photoelectric conversion section in general is described, reference numeral 1208 is used. When specific photoelectric conversion elements are described, reference signs 1208Ra, 1208Rb, 1208Ga, 1208Gb, 1208Ba and 1208Bb are used. As the semiconductor substrates 1209, for example, silicon substrates are used. The photoelectric conversion section 1208 is formed by, for example, an ion injection method. The unit pixel 1207R of red (R) includes a divided pixel 1207Ra including the photoelectric conversion section 1208Ra and a divided pixel 1207Rb including the photoelectric conversion section 1208Rb. The unit pixel 1207G of green (G) includes a divided pixel 1207Ga including the photoelectric conversion section 1208Ga and a divided pixel 1207Gb including the photoelectric conversion section 1208Gb. The unit pixel 1207B of blue (B) includes a divided pixel 1207Ba including the photoelectric conversion section 1208Ba and a divided pixel 1207Bb including the photoelectric conversion section 1208Bb. The divided pixels 1207Ra, 1207Ga and 1207Ba are pixels for acquiring the A image. The divided pixels 1207Rb, 1207Gb and 1207Bb are divided pixels for acquiring the B image.

Interlayer insulating films 1211 are formed on the semiconductor substrates 1209 on which photoelectric conversion sections 1208 are formed. Not-illustrated wires are formed on the interlayer insulating films 1211. Waveguides 1210 are embedded in the interlayer insulating films 1211. The waveguides 1210 are respectively formed with respect to the unit pixels 1207R, 1207G and 1207B. The color filters 1212R, 1212G, and 1212B are respectively formed on the interlayer insulating films 1211 in which the waveguides 1210 are embedded. The color filter 1212R is formed in the unit pixel 1207R of R, the color filter 1212G is formed in the unit pixel 1207G of G, and the color filter 1212B is formed in the unit pixel 1207B of B. The color filter 1212R has a spectral characteristic corresponding to a wavelength band of red. Consequently, light in the wavelength band of red reaches the photoelectric conversion sections 1208Ra and 1208Rb. The color filter 1212G has a spectral characteristic corresponding to a wavelength band of green. Consequently, light in the wavelength band of green reaches the photoelectric conversion sections 1208Ga and 1208Gb. The color filter 1212B has a spectral characteristic corresponding to a wavelength band of blue. Consequently, light in the wavelength band of blue reaches the photoelectric conversion sections 1208Ba and 1208Bb. Microlenses 1213 are respectively formed on the interlayer insulating films 1211 on which the color filters 1212R, 1212G and 1212B are formed. The microlenses 1213 are respectively formed with respect to the unit pixels 1207R, 1207G and 1207B.

The first light beam 1214a having passed through the first pupil region 1206a in the exit pupil 1205 reaches the divided pixels 1207Ra, 1207Ga and 1207Ba. The second light beam 1214b having passed through the second pupil region 1206b in the exit pupil 1205 reaches the divided pixels 1207Rb, 1207Gb and 1207Bb. The first signal forming the first image, that is, the A image is configured by a set of signals acquired by the large number of divided pixels 1207Ra, 1207Ga and 1207Ba. The second signal forming the second image, that is, the B image is configured by a set of signals acquired by the divided pixels 1207Rb, 1207Gb and 1207Bb. The divided pixels 1207Ra, 1207Ga and 1207Ba are pixels for obtaining the A image. Therefore, the divided pixels 1207Ra, 1207Ga and 1207Ba are called A pixels as well. The divided pixels 1207Rb, 1207Gb and 1207Bb are pixels for obtaining the B image. Therefore, the divided pixels 1207Rb, 1207Gb and 1207Bb are called B pixels as well. The A image and the B image acquired in this way are transmitted to the processing unit 103. Range finding operation processing is performed in the processing unit 103.

The processing unit 103 calculates a defocus amount, which is distance information, on the basis of a deviation amount between the A image and the B image, that is, an image deviation amount. An optical image of the object 105 is focused on the imaging element 1202 via the imaging optical system 1207. FIG. 12A illustrates a state in which the first light beam 1214a and the second light beam 1214b having passed through the exit pupil 1205 are respectively focused on an image forming surface 1203 and defocused optical images reach the imaging surface 1215 of the imaging element 1202. Note that the defocus means a state in which the image forming surface 1203 and the imaging surface 1215 do not coincide and the image forming surface 1203 deviates in the direction of an optical axis 1204 with respect to the imaging surface 1215. A defocus amount is the distance between the imaging surface 1215 and the image forming surface 1203 in the direction of the optical axis 1204. The processing unit 103 calculates a distance to the object 105 on the basis of the defocus amount. A relation indicated by Expression (6) below holds between an image deviation amount r indicating a relative positional deviation between the A image and the B image and a defocus amount ΔL.

$$\Delta L = \frac{rL}{W - r} \quad (6)$$

Note that W represents a base line length and L represents the distance between the imaging surface 1215 and the exit pupil 1205 in the direction of the optical axis 1204. The base line length W is equivalent to an interval on the exit pupil 1205 between the center of gravity of the first light beam 1214a passing through the first pupil region 1206a and the center of gravity of the second light beam 1214b passing the second pupil region 1206b.

Expression (6) can be simplified like Expression (7) below using a conversion coefficient K.

$$\Delta L \cong K \cdot r \quad (7)$$

Note that a calculation method for the defocus amount is not limited to the method described above. Other publicly-known methods may be used as appropriate.

The projecting unit (a first projecting unit) 102a is disposed in a position optically conjugate to the imaging unit 1101. That is, the exit pupil of the projecting unit 102a is disposed in a position optically conjugate to an entrance pupil of the imaging unit 1101 via the optical element 106a such as a prism or a half mirror. The projecting unit (a second projecting unit) 102b is disposed in a position optically conjugate to the imaging unit 1101. That is, the exit pupil of the projecting unit 102b is disposed in a position optically conjugate to the entrance pupil of the imaging unit 1101 via the optical element 106b such as a prism or a half mirror. In this way, in this embodiment, the two projecting units 102a and 102b are disposed in the positions optically conjugate to the imaging unit 1101. At least a part of a field of view of the imaging unit 1101 and at least a part of the projectable ranges of the projecting units 102a and 102b overlap each other. The projectable ranges of the projecting units 102a and 102b desirably coincide with the field of view of the imaging unit 1101 or include the field of view of the imaging unit 1101.

Like the projecting unit 102a described above in the first embodiment, the projecting unit 102a can project a patterned light on a desired region within the projectable range. The projecting unit 102a can also project a single color patterned light and can also project a color patterned light.

The projecting unit (the second projecting unit) 102b can project a patterned light different from the patterned light projected by the projecting unit 102a. For example, the projecting unit 102b can project a patterned light having a wavelength different from the wavelength (the color) of the patterned light projected by the projecting unit 102a. For example, a patterned light of visible light may be projected by the projecting unit 102a and a patterned light in a near infrared region may be projected by the projecting unit 102b. The projecting unit 102b can project a patterned light having illuminance different from the illuminance of the patterned light projected by the projecting unit 102a. For example, a patterned light having extremely high illuminance with respect to the patterned light projected by the projecting unit 102a may be projected by the projecting unit 102b. The controlling unit 104 can perform control to calculate a distance on the basis of a plurality of images acquired by the imaging unit 1101 in a state in which a patterned light is projected using another projecting unit 102b disposed in the position optically conjugate to the imaging unit 1101. The patterned light projected by the projecting unit 102a and the patterned light projected by the other projecting unit 102b are different from each other in the wavelength or the illuminance.

The projecting unit (a third projecting unit) 102c is disposed in a position not optically conjugate to the imaging unit 1101 and the projecting units 102a and 102b. When the luminance of a second region where a distance cannot be measured on the basis of a plurality of images acquired by the imaging unit 1101 in a state in which a patterned light is projected is equal to or larger than a second threshold, the controlling unit 104 can perform control as described below. That is, the controlling unit 104 can project a patterned light on the second region using the other projecting unit 102c disposed in a position different from the position of the projecting unit 102a. The controlling unit 104 can perform control to measure a distance on the basis of a plurality of images acquired by the imaging unit 1101 in a state in which a patterned light is projected on the second region using the other projecting unit 102c.

FIG. 13 is a flowchart illustrating the operation of the imaging apparatus according to this embodiment.

In step S1301, the controlling unit 104 acquires an image using the imaging unit 1101 in a state in which a patterned light is not projected.

In step S1302, the processing unit 103 calculates a distance to the object 105 using a first image and a second image, that is, a parallax image acquired by the imaging unit 1101. A distance can be satisfactorily calculated concerning a portion where a texture is present in the object 105. On the other hand, a distance cannot be satisfactorily calculated concerning a portion where a texture is absent and a portion where a repeated texture is present in the object 105. The processing unit 103 performs an analysis of the texture of the object 105 to thereby generate first projection control information (first region illumination information) for irradiating a suitable patterned light on a region where a distance cannot be satisfactorily calculated.

In step S1303, the controlling unit 104 performs imaging using the imaging unit 1101 in a state in which a patterned light is projected using the projecting unit (the first projecting unit) 102a on the basis of the first projection control information generated in step S1302.

In step S1304, the processing unit 103 performs, on the basis of a correlation between the first image and the second image acquired in step S1303, distance measurement for calculating distances to parts in the images. The processing unit 103 also performs the distance measurement for a region where a distance is already successfully satisfactorily calculated in step S1302. Since the distance is calculated on the basis of the parallax image acquired in the state in which the patterned light is irradiated, a distance can be satisfactorily calculated in a region wider than the region where the distance is successfully satisfactorily calculated in step S1302. The processing unit 103 generates a distance image indicating a two-dimensional distribution of a distance value on the basis of a distance value acquired in this way. However, even if the distance is measured on the basis of the parallax image acquired in the state in which the patterned light is projected based on the first projection control information, a region where a distance cannot be satisfactorily calculated is sometimes present. For example, in a region having a low reflectance in the object, sufficient reflected light cannot be obtained even if the patterned light is projected. Therefore, a distance sometimes cannot be satisfactorily calculated in the region. When a difference between a color of the region and a color of the patterned light is insufficient, a sufficient texture is not given to the region even if the patterned light is projected. A distance sometimes cannot be satisfactorily calculated. When light mirror-reflected in the region reaches the imaging unit 1101, a pixel value (luminance) is saturated. Therefore, a distance cannot be satisfactorily calculated. Therefore, in this embodiment, processing described below is performed.

In step S1305, the processing unit 103 determines whether a pixel value of the region where a distance cannot be satisfactorily calculated is smaller than a preset first threshold. When the pixel value of the region is smaller than the first threshold, it is conceivable that the reflectance of the region is extremely low or a difference between a color of the patterned light projected using the projecting unit 102a in step S1303 and a color of the region is insufficient. Therefore, in this case (YES in step S1305), the processing unit 103 shifts to step S1306. On the other hand, when the pixel value of the region is equal to or larger than the first threshold (NO in step S1305), the processing unit 103 shifts to step S1309.

In step S1306, the processing unit 103 generates second projection control information. For example, second projection control information for projecting a patterned light having large illuminance (a large light amount) on the region with the projecting unit (the second projecting unit) 102b is formed. The processing unit 103 may form second projection control information for projecting, on the region, a patterned light having a color sufficiently different from the color of the patterned light projected using the projecting unit 102a in step S1303. If such a patterned light is projected on the region, it is possible to add a sufficient texture to the region.

In step S1307, the controlling unit 104 performs capturing using the imaging unit 1101 in a state in which a patterned light is projected using the projecting unit (the second projecting unit) 102b on the basis of the second projection control information generated in step S1306.

In step S1308, the processing unit 103 performs, on the basis of the correlation between the first image and the second image acquired in step S1307, distance measurement for calculating distances to the parts in the images. The processing unit 103 may perform the distance measurement again or may not perform the distance measurement again for a region where a distance is already successfully satisfactorily calculated. Since the distance is calculated on the basis of the parallax image acquired in the state in which the patterned light is irradiated using the projecting unit 102b on the basis of the second projection control information, a distance sometimes can be satisfactorily calculated in a region where a distance is not successfully satisfactorily calculated in step S1304. For example, when the reflectance of the region is low or when a difference between a color of the patterned light projected using the projecting unit 102a in step S1303 and a color of the region is insufficient, a distance to the region can be satisfactorily calculated in step S1308. The processing unit 103 updates the distance image generated in step S1304 using a distance value successfully satisfactorily acquired anew. In this way, a more satisfactory distance image is obtained.

In step S1309, the processing unit 103 determines whether a pixel value of the region where a distance cannot be satisfactorily calculated is equal to or larger than a preset second threshold. Note that the second threshold is equal to or larger than the first threshold. When the pixel value of the region is equal to or larger than the second threshold, it is conceivable that light mirror-reflected in the region reaches the imaging unit 1101. Therefore, in this case (YES in step S1309), the processing unit 103 shifts to step S1310. On the other hand, when the pixel value of the region is smaller than the second threshold (NO in step S1309), the processing unit 103 ends the processing illustrated in FIG. 13.

In step S1310, the processing unit 103 generates third projection control information. The processing unit 103 generates third projection control information for projecting a patterned light with the projecting unit (the third projecting unit) 102c not optically conjugate to the imaging unit 1101. If the patterned light is projected by the projecting unit 102c not optically conjugate to the imaging unit 1101, that is, the projecting unit 102c not optically conjugate to the projecting unit 102a, it is possible to prevent the light mirror-reflected in the region from reaching the imaging unit 1101.

In step S1311, the controlling unit 104 performs capturing using the imaging unit 1101 in a state in which a patterned light is projected using the projecting unit (the third projecting unit) 102c on the basis of the third projection control information generated in step S1310.

In step S1312, the processing unit 103 performs, on the basis of a correlation between a first image and a second image acquired in step S1311, distance measurement for calculating distances to parts in the images. The processing unit 103 may perform the distance measurement again or may not perform the distance measurement again for a region where a distance is already successfully satisfactorily calculated. The distance is calculated on the basis of a parallax image acquired in a state in which a patterned light is projected using the projecting unit 102c on the basis of the third projection control information. Therefore, a distance sometimes can be satisfactorily calculated in a region where a distance is not successfully satisfactorily calculated in step S1304 or step S1308. For example, when the patterned light projected using the projecting units 102a and 102b is mirror-reflected in the region and reaches the imaging unit 1101, a distance to the region can be satisfactorily calculated in step S1312. The processing 103 updates the already generated distance image using a distance value successfully satisfactorily acquired anew. In this way, a more satisfactory distance image is obtained.

According to this embodiment, a distance value is calculated on the basis of the parallax image acquired in the state in which the patterned light projected using the projecting units 102b and 102c is projected on the basis of the second or third projection control information different from the first projection control information. Therefore, it is possible to satisfactorily calculate a distance value for a region where a distance value cannot be satisfactorily acquired on the basis of the parallax image acquired in the state in which the patterned light projected using the projecting unit 102a is projected on the basis of the first projection control information. Therefore, according to this embodiment, it is possible to provide a distance measuring apparatus and an imaging apparatus including the distance measuring apparatus that can more satisfactorily measure a distance.

(Modification 1)

Figure 14:
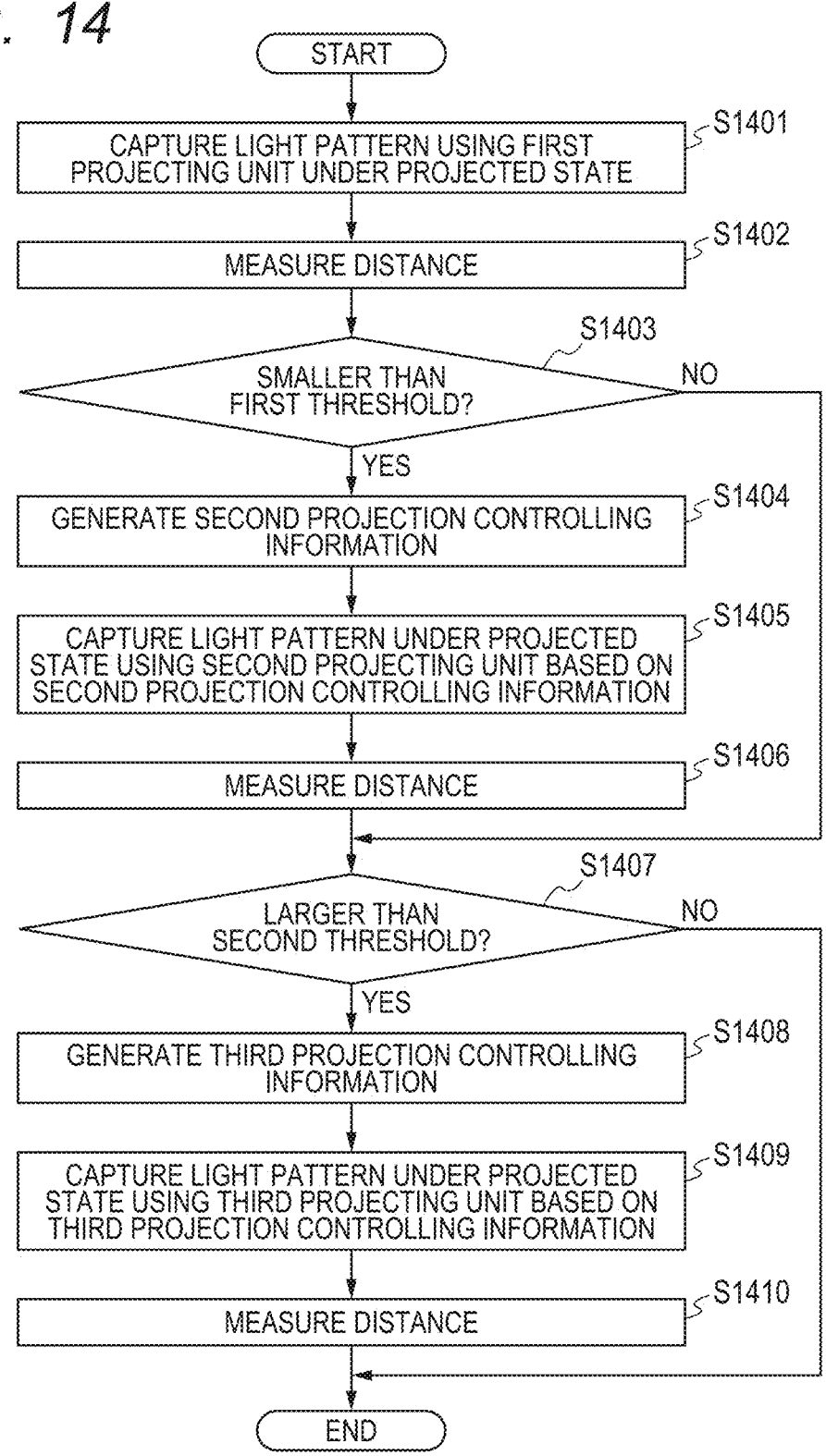
FIG. 14 is a flowchart illustrating the operation of an imaging apparatus according to a modification 1 of the second embodiment.

A distance measuring apparatus, a distance measuring method, and an imaging apparatus according to a modification 1 of this embodiment are described with reference to FIG. 14. FIG. 14 is a flowchart illustrating the operation of the imaging apparatus according to this modification. The configuration of the imaging apparatus according to this modification is the same as the configuration of the imaging apparatus described above with reference to FIGS. 11 to 12E. In step S1401, the controlling unit 104 performs imaging using the imaging unit 1101 in a state in which a patterned light is projected on the entire region of the projectable range of the projecting unit (the first projecting unit) 102a. Steps S1402 to S1410 are the same as steps S1304 to S1312 described above with reference to FIG. 13. Therefore, description of the steps is omitted. A distance may be measured in this way under an environment in which it is difficult to measure a distance without projecting a patterned light.

(Modification 2)

Figure 15:
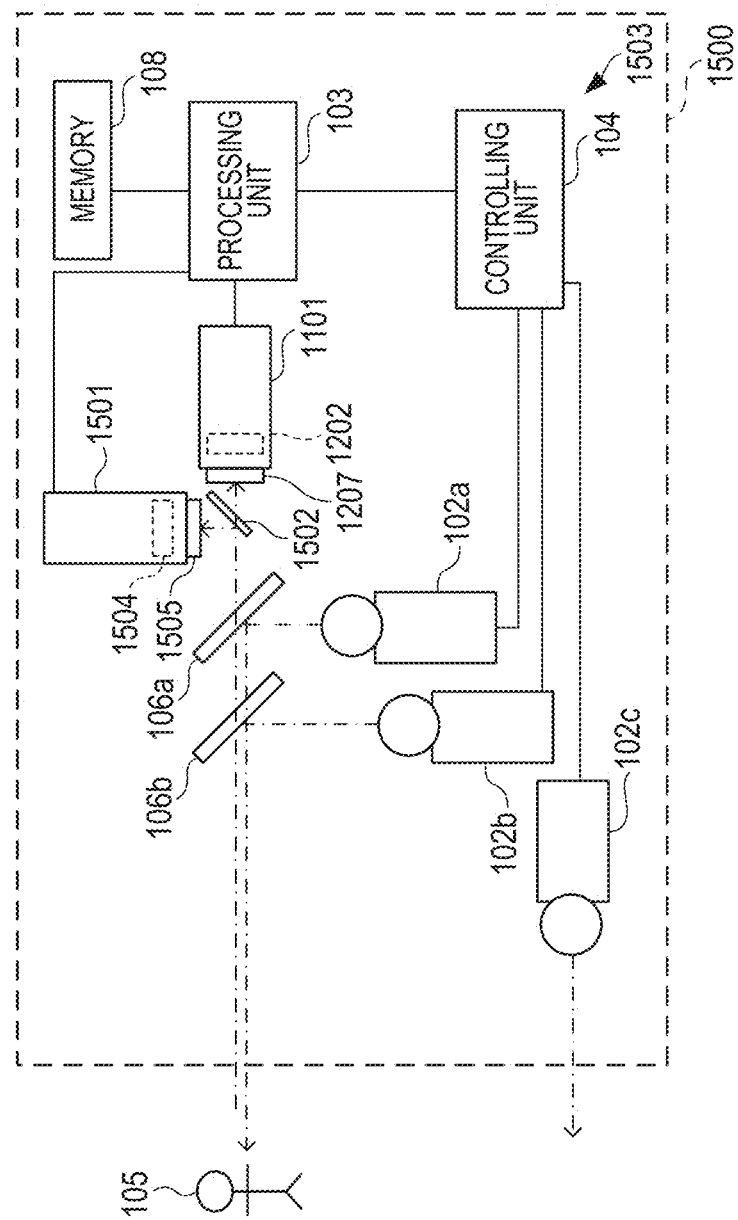
FIG. 15 is a block diagram illustrating an imaging apparatus according to a modification 2 of the second embodiment.

A distance measuring apparatus, a distance measuring method, and an imaging apparatus according to a modification 2 of this embodiment are described with reference to FIG. 15. FIG. 15 is a block diagram illustrating the imaging apparatus according to this modification. As illustrated in FIG. 15, an imaging apparatus 1500 according to this modification includes a distance measuring apparatus 1503. The distance measuring apparatus 1503 includes two imaging units 1101 and 1501, the three projecting units 102a to 102c, the processing unit 103, the controlling unit 104, the optical elements 106a and 106b, and the memory 108.

The imaging unit 1501 is disposed in a position optically conjugate to the imaging unit 1101. That is, an entrance pupil of the imaging unit 1501 is disposed in a position optically conjugate to the entrance pupil of the imaging unit 1101 via an optical element 1502 such as a prism or a half mirror. The imaging unit 1501 includes an imaging element 1504. The imaging unit 1501 includes an imaging optical system (a lens or a lens unit) 1505. Like the imaging optical system 1207, the imaging optical system 1505 is an imaging optical system configured to be divided into a first pupil region and a second pupil region, exit pupils of which are different from each other, that is, a pupil division optical system. The imaging optical system 1505 may be detachable or may be non-detachable from a main body of the imaging unit 1501. Like the imaging unit 1101, the imaging unit 1501 includes the imaging element 1504. Like the imaging element 1202, the imaging element 1504 can acquire a plurality of optical images, that is, a first optical image and a second optical image formed by a first light beam and a second light beam respectively passing through the first pupil region and the second pupil region of the imaging optical system 1505. Capturing sensitivity of the imaging unit 1501 is different from capturing sensitivity of the imaging unit 1101. The capturing sensitivity of the imaging unit 1101 is set, for example, relatively low. On the other hand, the capturing sensitivity of the imaging unit 1501 is set, for example, relatively high. Since the capturing sensitivity of the imaging unit 1101 is set relatively low, if a distance is measured on the basis of a parallax image acquired by the imaging unit 1101, it is possible to satisfactorily measure the distance even when the luminance of an object is relatively high. On the other hand, since the capturing sensitivity of the imaging unit 1501 is set relatively high, if a distance is measured on the basis of the parallax image acquired by the imaging unit 1101, it is possible to satisfactorily measure the distance even when the luminance of the object is relatively low. If a distance image is generated using results of these measurements as appropriate, it is possible to obtain a satisfactory distance image.

Note that an example is described in which the capturing sensitivity of the imaging unit 1101 and the capturing sensitivity of the imaging unit 1501 are differentiated. However, the present invention is not limited to this. For example, a capturing wavelength region of the imaging unit 1101 and a capturing wavelength region of the imaging unit 1501 may be differentiated. The capturing wavelength region of the imaging unit 1101 is, for example, a visible light region. The capturing wavelength region of the imaging unit 1501 is, for example, a near infrared region. The processing unit 103 performs distance measurement using a parallax image acquired by the imaging unit 1101. The processing unit 103 performs distance measurement using a parallax image acquired by the imaging unit 1501. If a distance image is generated using results of the distance measurements as appropriate, it is possible to obtain a satisfactory distance image.

Third Embodiment

Figure 16:
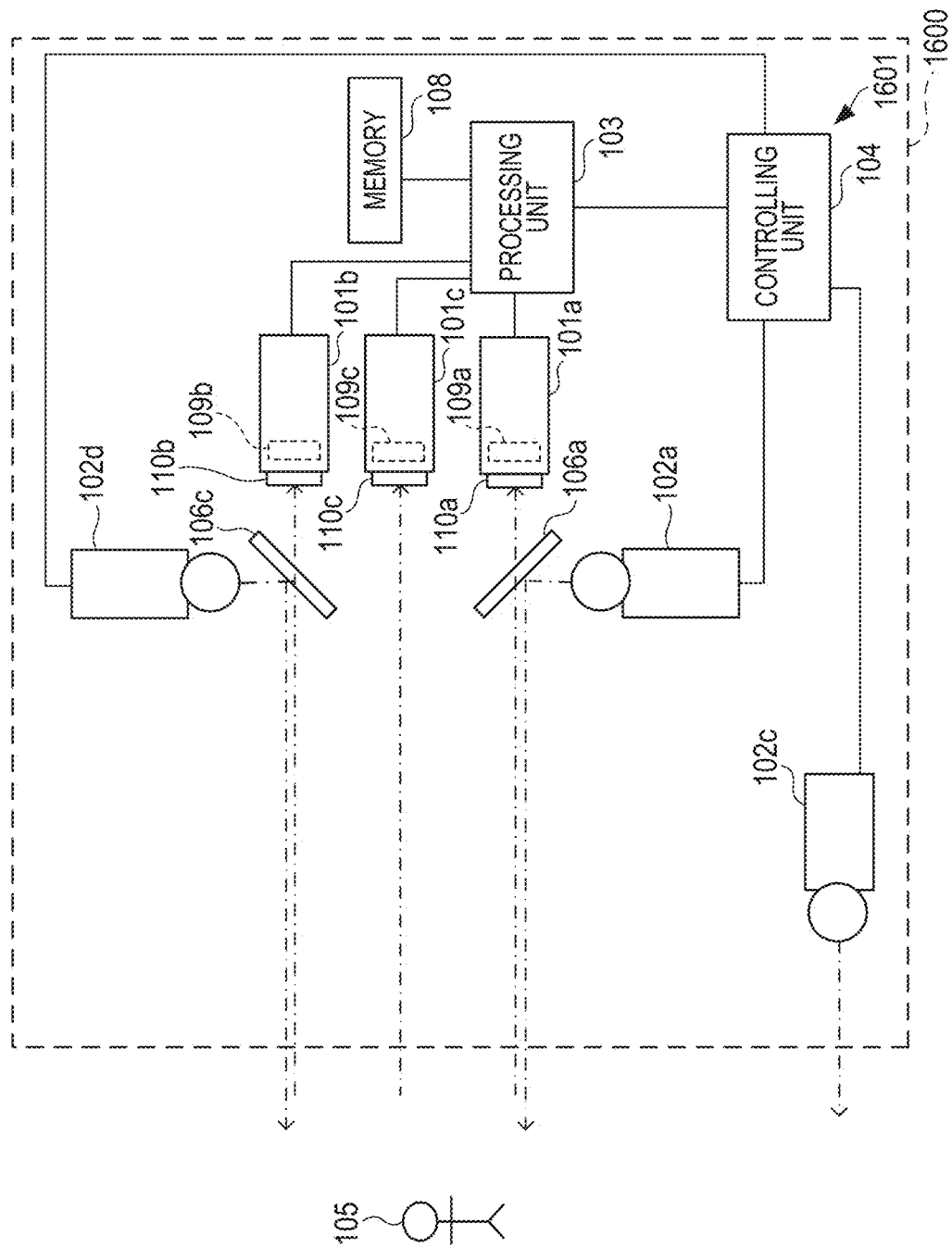
FIG. 16 is a block diagram illustrating an imaging apparatus according to a third embodiment.

A distance measuring apparatus, a distance measuring method, and an imaging apparatus according to a third embodiment are described with reference to FIG. 16. FIG. 16 is a block diagram illustrating the imaging apparatus according to this embodiment. The same components as the components of the imaging apparatus according to the first or second embodiment illustrated in FIGS. 1 to 15 are denoted by the same reference numerals and signs. Description of the components is omitted or simplified.

As illustrated in FIG. 16, an imaging apparatus 1600 according to this embodiment includes a distance measuring apparatus 1601. The distance measuring apparatus 1601 includes three imaging units 101a to 101c, three projecting units 102a, 102c and 102d, the processing unit 103, the controlling unit 104, the optical elements 106 and 106b, and the memory 108. The configuration of the imaging unit 101c is the same as the configuration of the imaging units 101a and 101b described with reference to FIG. 1. The imaging units 101a to 101c are disposed in positions different from one another. The imaging units 101a to 101c perform capturing from view points different from one another. According to this embodiment, images are acquired using the three imaging units 101a to 101c disposed in positions different from one another. Therefore, three images, among which a parallax occurs, are obtained. Capturing performed using three imaging units is called trinocular stereo view as well. The imaging unit (the third imaging unit) 101c includes an imaging element (an image sensor) 109c in which a not-illustrated plurality of pixels is disposed in a matrix shape on a not-illustrated imaging surface. The imaging unit 101c includes an imaging optical system (a lens unit) 110c. The imaging optical system 110c may be detachable or may be non-detachable from the imaging unit 101c. The imaging unit 101c captures the object 105 to thereby acquire a first image (third image data).

The projecting unit 102a is disposed in a position optically conjugate to the imaging unit 101a. That is, the exit pupil of the projecting unit 102a is disposed in a position optically conjugate to the entrance pupil of the imaging unit 101a via the optical element 106a such as a prism or a half mirror. The projecting unit 102d is disposed in a position optically conjugate to the imaging unit 101b. That is, an exit pupil of the projecting unit 102d is disposed in a position optically conjugate to an entrance pupil of the imaging unit 101b via an optical element 106c such as a prism or a half mirror.

In a state in which a patterned light is projected on a desired region using the projecting unit 102a, the controlling unit 104 performs imaging using the imaging units 101a to 101c and acquires a first parallax image formed by three images, among which a parallax occurs.

In a state in which a patterned light is projected on a desired region using the projecting unit 102c, the controlling unit 104 performs imaging using the imaging units 101a to 101c and acquires a second parallax image formed by three images, among which a parallax occurs.

When the first parallax image is acquired, a patterned light optimum for acquiring the first parallax image is projected from the projecting unit 102a. When the second parallax image is acquired, a patterned light optimum for acquiring the second parallax image is projected from the projecting unit 102d. The patterned light projected by the projecting unit 102a when the first parallax image is acquired and the patterned light projected by the projecting unit 102d when the second parallax image is acquired are different from each other.

The processing unit 103 measures a distance with, for example, a multi-baseline stereo method on the basis of the first parallax image. The processing unit 103 measures a distance with, for example, the multi-baseline stereo method on the basis of the second parallax image. The processing unit 103 generates a distance image using results of the measurements as appropriate. According to this embodiment, since a distance is measured using the three images, among which a parallax occurs, it is possible to more highly accurately measure the distance.

Modified Embodiment

The present invention is described above with reference to the exemplary embodiments of the present invention. However, the present invention is not limited to these specific embodiments. Various forms in a range not departing from the spirit of the present invention are included in the present invention.

For example, in the first embodiment, the imaging unit 101a, the imaging unit 101b, the optical element 106a, the projecting unit 102a, the processing unit 103, and the controlling unit 104 may be included in a not-illustrated body of the imaging apparatus 100.

In the second embodiment, the example is described in which the processing unit 103 and the controlling unit 104 are disposed separately from the imaging unit 1101. However, the present invention is not limited to this. For example, the processing unit 103, the controlling unit 104, the optical elements 106a and 106b, and the projecting units 102a to 102c may be included in the body 1216 of the imaging unit 1101.

In the third embodiment, the imaging units 101a to 101c, the optical elements 106a and 106c, the projecting units 102a, 102c and 102d, the processing unit 103, and the controlling unit 104 may be included in a not-illustrated body of the imaging apparatus 1600.

In the embodiments, the example is described in which the processing units (the arithmetic unit) 103 and the controlling unit 104 are separately provided. However, the present invention is not limited to this. The processing unit 103 and the controlling unit 104 may be integrated. The processing unit 103 can be grasped as a part of the controlling unit. The controlling unit 104 and the processing unit 103 may be configured by a system LSI.

A method of detecting presence or absence of an object, a position of the object, and a region of the object is not limited to the embodiments. For example, a position of an object and a region of the object may be detected on the basis of a change in luminance and a change in a color in an image (see Japanese Patent Application Laid-Open No. H11-190816). Presence or absence of an object, a position of the object, and a region of the object may be detected on the basis of distance information (see Japanese Patent Application Laid-Open No. 2007-96437). Presence or absence of an object, a position of the object, and a region of the object may be detected on the basis of a change in a luminance gradient (see Japanese Patent Application Laid-Open No. 2000-207564). A position of an object and a region of the object may be detected using K-means clustering ("Comparison of Segmentation Approaches" by Beth Horn, et. al., Decision Analyst Inc., (2009)).

In the embodiments, a feature value calculating method such as an SIFT (Scale-Invariant Feature Transform) may be supplementally performed. The region of the object may be further precisely calculated supplementally using information obtained by the feature value calculating method. For example, an SIFT feature value may be further aggregated into a BoF (Bug Of Features). The region of the object may be precisely calculated using the BoF. A multidimensional feature value such as the BoF may be used for determination of presence of absence of a main object and determination of the main object likeness ("Objects in context" by A. Rabinovich, et. al., 2007 IEEE 11th International Conference on Computer Vision, (2007)). A manufacturer or a user of the imaging apparatus may cause a discriminator such as a neural network, deep learning, or an n-ary tree to learn, beforehand, a multidimensional feature value extracted from an image of an object of a main object candidate. A search may be executed on the multidimensional feature value extracted from the image to calculate likelihood of the main object likeness. Consequently, it is possible to flexibly recognize, as the main object, any object that the manufacturer or the user considers as the main object. The region of the object may be detected supplementally using a technique such as Graph Cut. A change in region information in a time direction may be used for improvement of detection accuracy of a boundary.

In the third embodiment, the example is described in which the three imaging units are provided. However, four or more imaging units may be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-090624, filed Apr. 28, 2017, which is hereby incorporated by reference herein in its entirety.

What is claimed is:

1. A distance measuring apparatus comprising:
   at least one processor; and
   a memory storing an instruction which, when the instruction is executed by the processor, causes the distance measuring apparatus to function as:
      an imaging unit capable of acquiring a plurality of images having view points different from one another; and
      a controlling unit configured to perform controlling to acquire the plurality of images with the imaging unit in a state in which a patterned light is projected on any region using a projecting unit disposed in a position optically conjugate to the imaging unit and measure a distance on the basis of the plurality of images acquired by the imaging unit,
      wherein the control unit controls at least one of illuminance of a patterned light projected using a projecting unit, a wavelength of the patterned light and whether the patterned light is projected or not in each of regions based on the image by the imaging unit.

2. The distance measuring apparatus according to claim 1, wherein the controlling unit determines, on the basis of space frequencies of textures of respective regions in the image acquired by the imaging unit, the region on which the patterned light is projected.

3. The distance measuring apparatus according to claim 1, wherein the controlling unit determines, on the basis of possibility of measurement of a distance based on the plurality of images acquired by the imaging unit, a region on which the patterned light is projected.

4. The distance measuring apparatus according to claim 1, wherein the controlling unit performs control to measure a distance on the basis of a plurality of images acquired by the imaging unit in a state in which another patterned light having a pattern, illuminance, or a waveform different from the pattern, the illuminance, or the waveform of the patterned light is projected on a first region where a distance cannot be measured on the basis of the plurality of images acquired by the imaging unit in the state in which the patterned light is projected.

5. The distance measuring apparatus according to claim 4, wherein, when luminance of the first region at a time when the patterned light is projected is smaller than a first threshold, the controlling unit performs control to measure a distance on the basis of the plurality of images acquired by the imaging unit in a state in which the other patterned light having illuminance higher than the illuminance of the patterned light is projected on the first region.

6. The distance measuring apparatus according to claim 4, wherein, when luminance of the first region at a time when the patterned light is projected is smaller than a first threshold, the controlling unit performs control to measure a distance on the basis of the plurality of images acquired by the imaging unit in a state in which the other patterned light having wavelength different from the wavelength of the patterned light is projected on the first region.

7. The distance measuring apparatus according to claim 1, wherein, when luminance of a second region where distance cannot be measured on the basis of the plurality of images acquired by the imaging unit in a state in which the patterned light is projected is equal to or larger than a second threshold, the controlling unit performs control to measure a distance on the basis of a plurality of images acquired by the imaging unit in a state in which a patterned light is projected on the second region using another projecting unit disposed in a position different from a position of the projecting unit.

8. The distance measuring apparatus according to claim 1, wherein the controlling unit performs control to project the patterned light on a region where a repeated pattern is present.

9. The distance measuring apparatus according to claim 1, further comprising another imaging unit disposed in a position optically conjugate to the imaging unit, wherein the imaging unit and the other imaging unit are different from each other in capturing sensitivity or a capturing wavelength region.

10. The distance measuring apparatus according to claim 1, wherein
the controlling unit performs control to calculate a distance on the basis of a plurality of images acquired by the imaging unit in a state in which a patterned light is projected using another projecting unit disposed in a position optically conjugate to the imaging unit, and
the patterned light projected by the projecting unit and the patterned light projected by the other projecting unit are different from each other in a wavelength or illuminance.

11. The distance measuring apparatus according to claim 1, wherein the imaging unit includes a plurality of imaging elements disposed in positions different from one another.

12. The distance measuring apparatus according to claim 11, wherein the imaging unit includes a trio or more of the imaging elements.

13. The distance measuring apparatus according to claim 1, wherein the imaging unit acquires the plurality of images from an imaging element on which unit pixels are two-dimensionally disposed, the unit pixels including a first divided pixel that acquires a signal corresponding to a first light beam passing through a first pupil region of an imaging optical system and a second divided pixel that acquires a signal corresponding to a second light beam passing through a second pupil region different from the first pupil region of the imaging optical system.

14. A distance measuring method comprising:
acquiring, in a state in which a patterned light is projected on any region using a projecting unit disposed in a position optically conjugate to an imaging unit, with the imaging unit, a plurality of images having view points different from one another;
measuring a distance on the basis of the plurality of images acquired by the imaging unit; and
controlling at least one of illuminance of a patterned light projected using a projecting unit, a wavelength of the patterned light and whether the patterned light is projected or not in each of regions based on the image by the imaging unit.

15. An imaging apparatus comprising:
at least one processor; and
a memory storing an instruction which, when the instruction is executed by the processor, causes the distance measuring apparatus to function as:
an imaging unit capable of acquiring a plurality of images having view points different from one another; and
a controlling unit configured to perform control to acquire the plurality of images with the imaging unit in a state in which a patterned light is projected on any region using a projecting unit disposed in a position optically conjugate to the imaging unit and measure a distance on the basis of the plurality of images acquired by the imaging unit,
wherein the control unit controls at least one of illuminance of a patterned light projected using a projecting unit, a wavelength of the patterned light and whether the patterned light is projected or not in each of regions based on the image by the imaging unit.

16. A distance measuring apparatus comprising:
an imaging unit capable of acquiring a plurality of images having view points different from one another at least one processor; and
a memory storing an instruction which, when the instruction is executed by the processor, causes the distance measuring apparatus to function as:
a controlling unit configured to perform control to acquire the plurality of images with the imaging unit in a state in which a patterned light is projected on any region using a projecting unit disposed in a position optically conjugate to the imaging unit and measure a distance on the basis of the plurality of images acquired by the imaging unit, and
wherein the imaging unit includes an imaging element on which unit pixels are two-dimensionally disposed, the unit pixels including a first divided pixel that acquires a signal corresponding to a first light beam passing through a first pupil region of an imaging optical system and a second divided pixel that acquires a signal corresponding to a second light beam passing through a second pupil region different from the first pupil region of the imaging optical system.

17. A distance measuring method comprising:
acquiring, in a state in which a patterned light is projected on any region using a projecting unit disposed in a position optically conjugate to an imaging unit, with the imaging unit, a plurality of images having view points different from one another; and
measuring a distance on the basis of the plurality of images acquired by the imaging unit, and
wherein the imaging unit includes an imaging element on which unit pixels are two-dimensionally disposed, the unit pixels including a first divided pixel that acquires a signal corresponding to a first light beam passing through a first pupil region of an imaging optical system and a second divided pixel that acquires a signal corresponding to a second light beam passing through a second pupil region different from the first pupil region of the imaging optical system.

* * * * *